(12) United States Patent
Goldenberg

(10) Patent No.: US 8,872,819 B2
(45) Date of Patent: Oct. 28, 2014

(54) COMPUTATIONAL GEOMETRY DESIGN FOR SHEET METAL MACHINERY CORNER

(75) Inventor: Alex Goldenberg, St. Louis, MO (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 2905 days.

(21) Appl. No.: 11/226,068

(22) Filed: Sep. 14, 2005

(65) Prior Publication Data

US 2006/0059855 A1 Mar. 23, 2006

Related U.S. Application Data

(60) Provisional application No. 60/609,777, filed on Sep. 14, 2004.

(51) Int. Cl.
*G06T 17/00* (2006.01)

(52) U.S. Cl.
USPC .......................................... 345/420; 345/419

(58) Field of Classification Search
None
See application file for complete search history.

(56) References Cited

U.S. PATENT DOCUMENTS

| | | | | |
|---|---|---|---|---|
| 5,619,625 | A * | 4/1997 | Konno et al. | 345/419 |
| 5,793,373 | A | 8/1998 | Sekine et al. | |
| 6,144,896 | A * | 11/2000 | Kask et al. | 700/182 |
| 6,694,199 | B1 * | 2/2004 | Yamada et al. | 700/86 |

OTHER PUBLICATIONS

Yamashina H, Fukushima K, Saijo A (1996) CAD for free-form surfaces. Comput Integr Manuf Syst 9(1):9-18.*
White Paper: Pro/Sheetmetal Bend Relief, http://www.ptc.com/user_data/download/prouser/sheetmetal/bend_relief_wp.pdf, dated Feb. 4, 1999.*
Anonymous: "SolidWorks Closed Corner—chapter 1 Introduction" Sheetmetaldesign Homepage, 'Online! Jul. 5, 2004, pp. 1-12, XP002369212 pp. 2-3; 5-6 and 7-8.
Anonymous: "SolidWorks Office FAQs" Solidworks Homepage, 'Online! Jul. 1, 2004, pp. 1-9, XP002369213 pp. 4, paragraph 7, p. 5, paragraph 1.
Anonymous: "SolidWorks Education Edition Getting Started" Solidworks Education Edition, 'Online! Jul. 11, 2004, pp. I-Index-10, XP002369214 pp. 4-6, paragraph 1, pp. 13-4, paragraph 10, pp. 18-1, pp. 18-8, pp. 24-7, paragraph 1-5.
Anonymous: "SMLib Tutorial"; Solid Modeling Systems Libraries (Product Overview), Aug. 11, 2004, XP002333831; Solid Modeling Systems, p. 1, para1, p. 8.
Anonymous: "SMLib Functionality"; Solid Modeling Systems Libraries (Product Overview), [Online], Nov. 7, 2004, pp. 1-38, XP002396047.
Anonymous: "SolidWorks Education Edition Getting Started" Solidworks Education Edition, 'Online! Jul. 11, 2004, pp. I-Index-10, XP002369214.
Mueller Timothy Irwin: "Geometric Modelling with Multivariate B-Splines" Jun. 1986, University of Utah, Salt Lake City, UT; XP007901011, p. 5, par 1-p. 7, par 1, fig 1,2.
Anonymous: "Pro/Sheetmetal" www.cad-resources.com [online]; Apr. 7, 2004), p. 1-125, XP007901024.
Parametric Technology Corporation: "Pro/Sheetmetal Topic Collection" Pro/Engineer 2001, [Online]; Sep. 6, 2000, pp. 1-102, XP007901023, Retrieved from the Internet.

* cited by examiner

*Primary Examiner* — Daniel Hajnik

(57) ABSTRACT

One or more embodiments of the presently preferred invention provides a method and a computer-program product for creating a parametric corner on a sheet metal design. The parametric corner is a machinery corner that can be constructed in the formed or unformed state and successfully handles a bend corner with different radii and bend angles. Further, the machinery corner allows placing features thereon, as well as producing unformed geometrical representations of said placement.

25 Claims, 44 Drawing Sheets

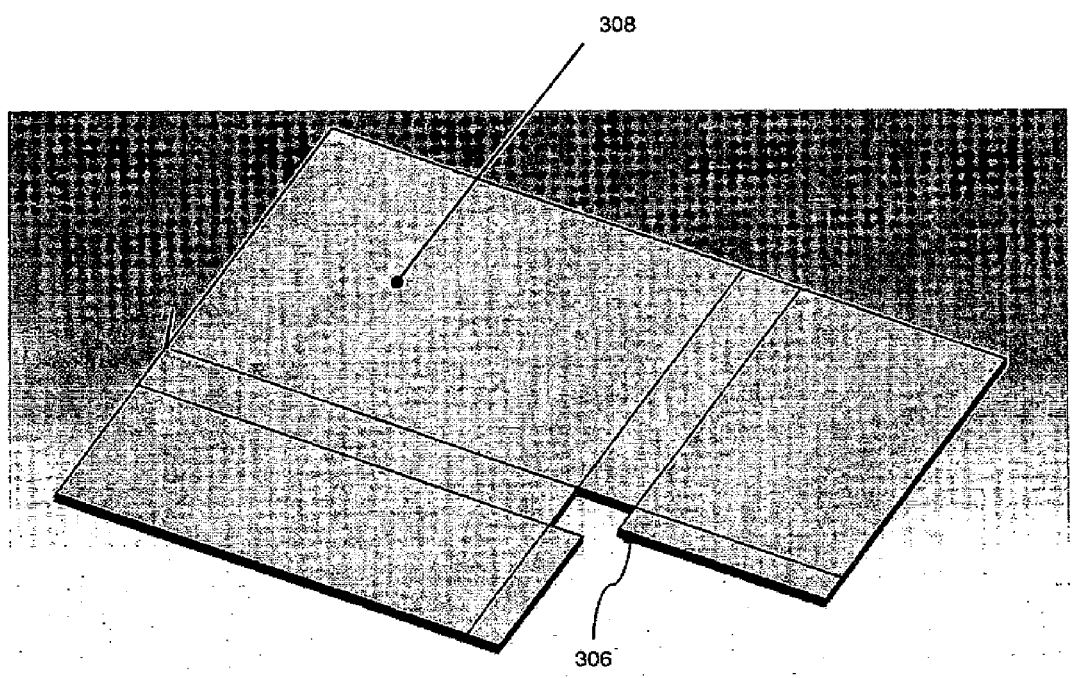
Fig. 3"

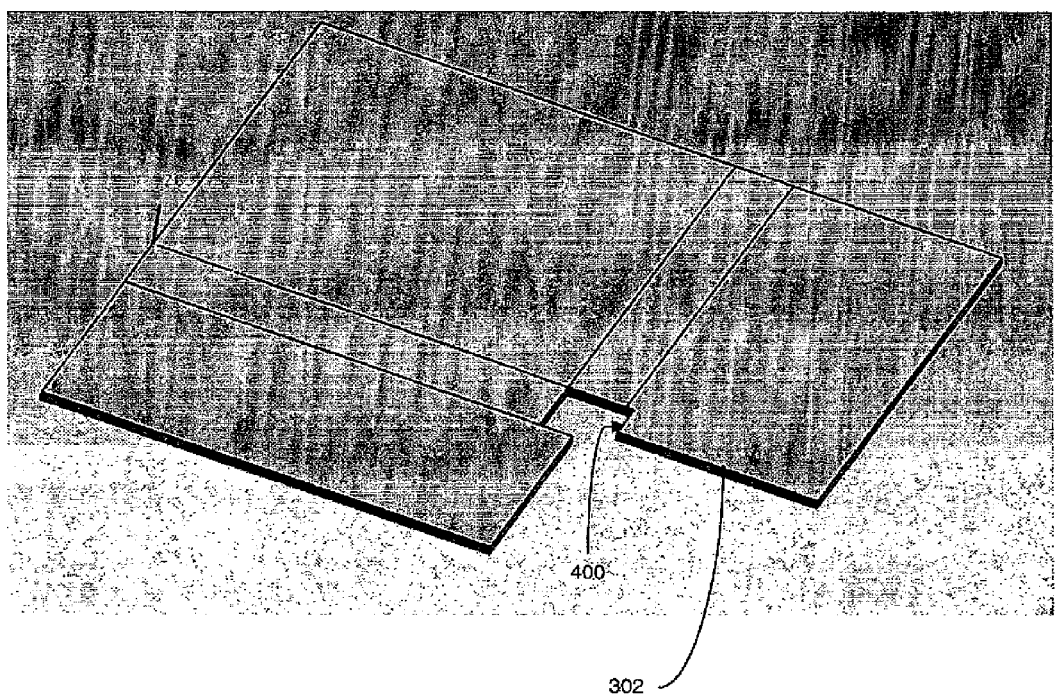
Fig. 4"

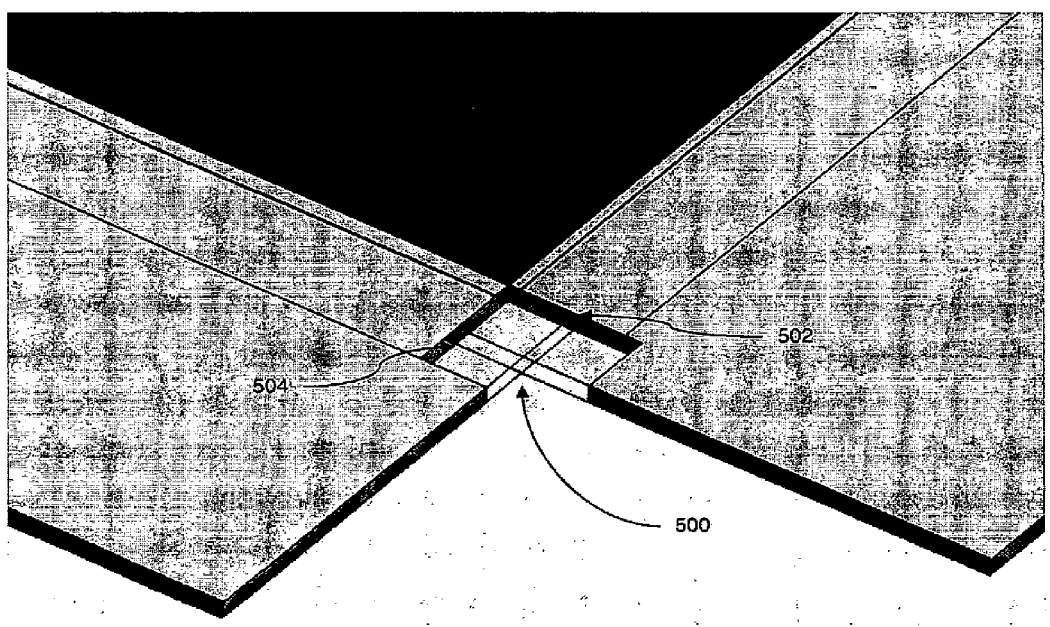
Fig. 5"

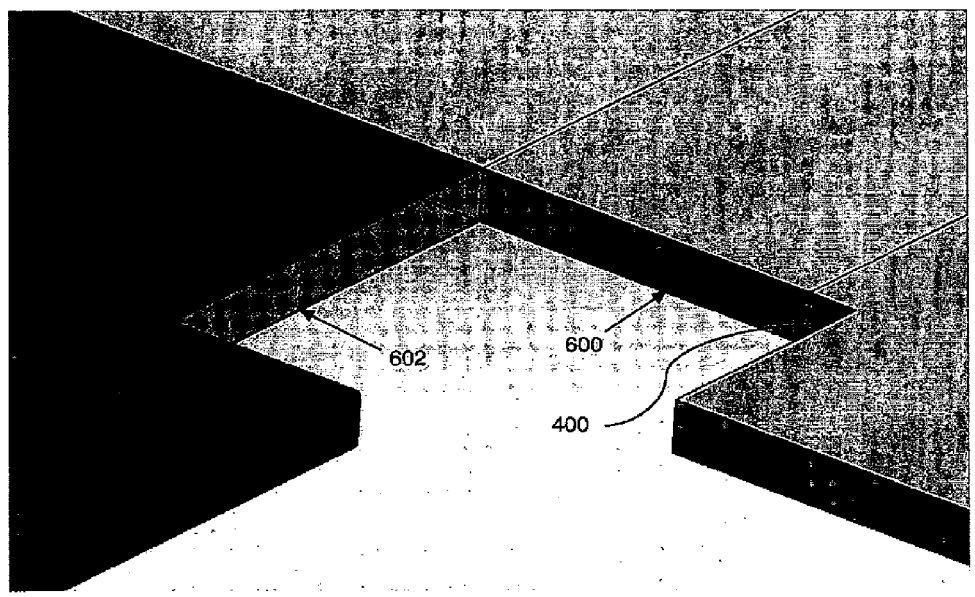
Fig. 6"

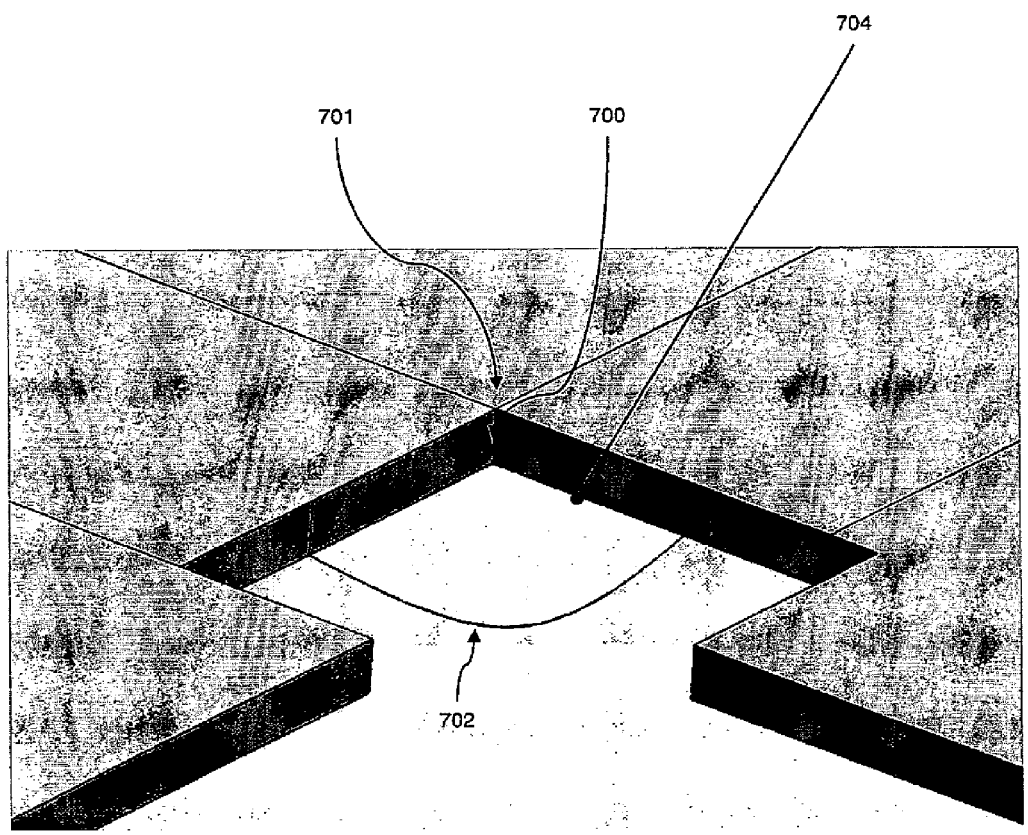
Fig. 7"

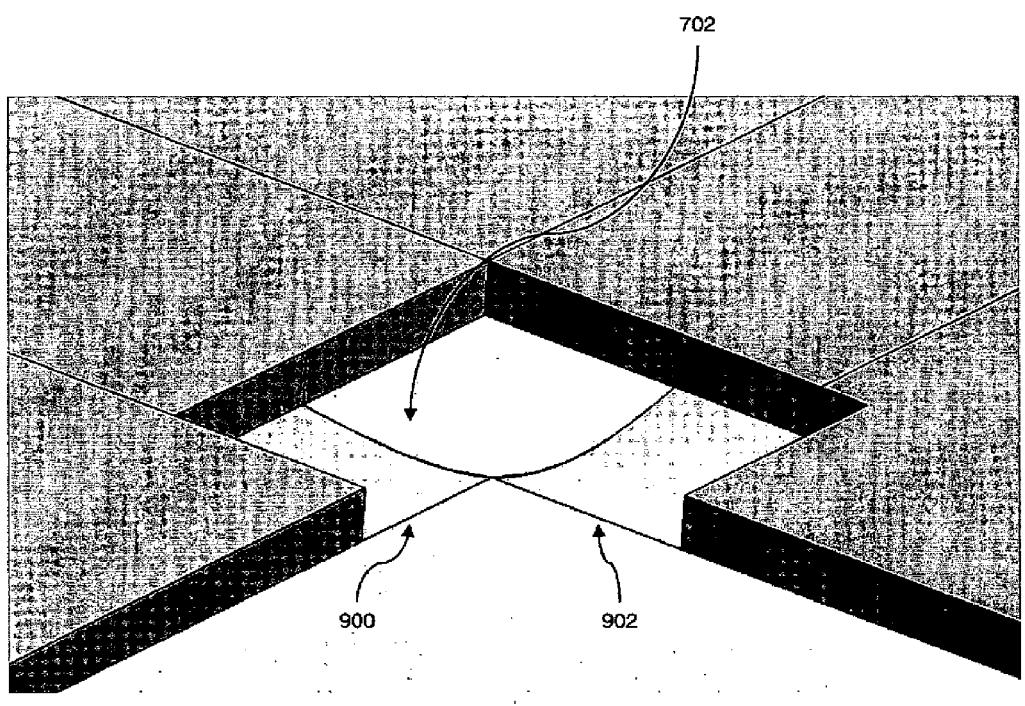
Fig. 9"

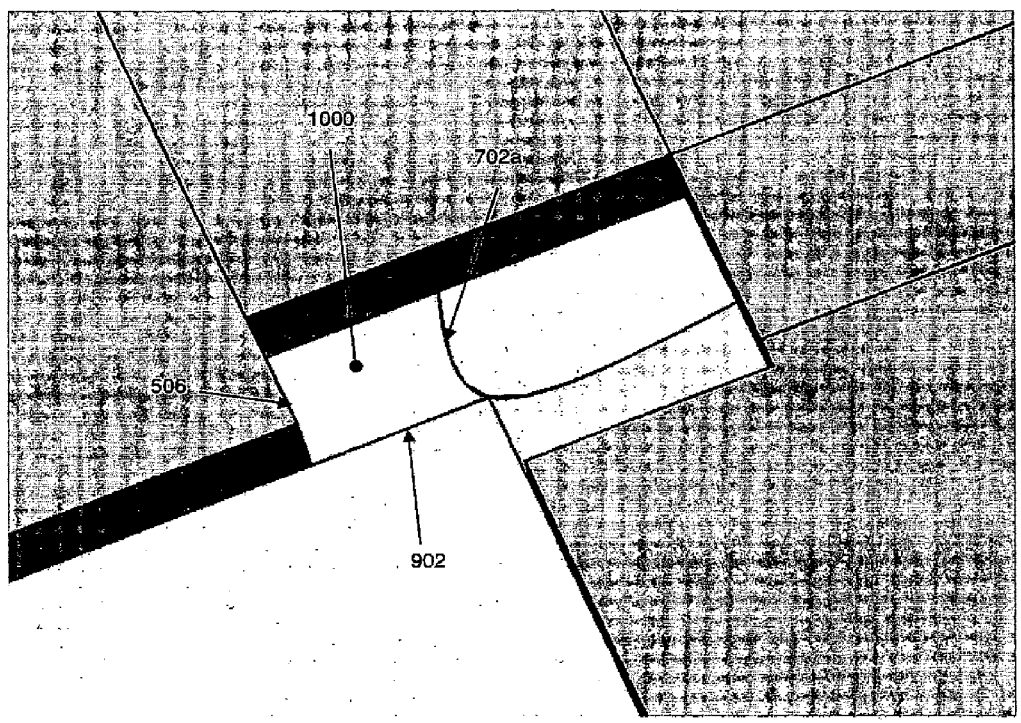
Fig. 10"

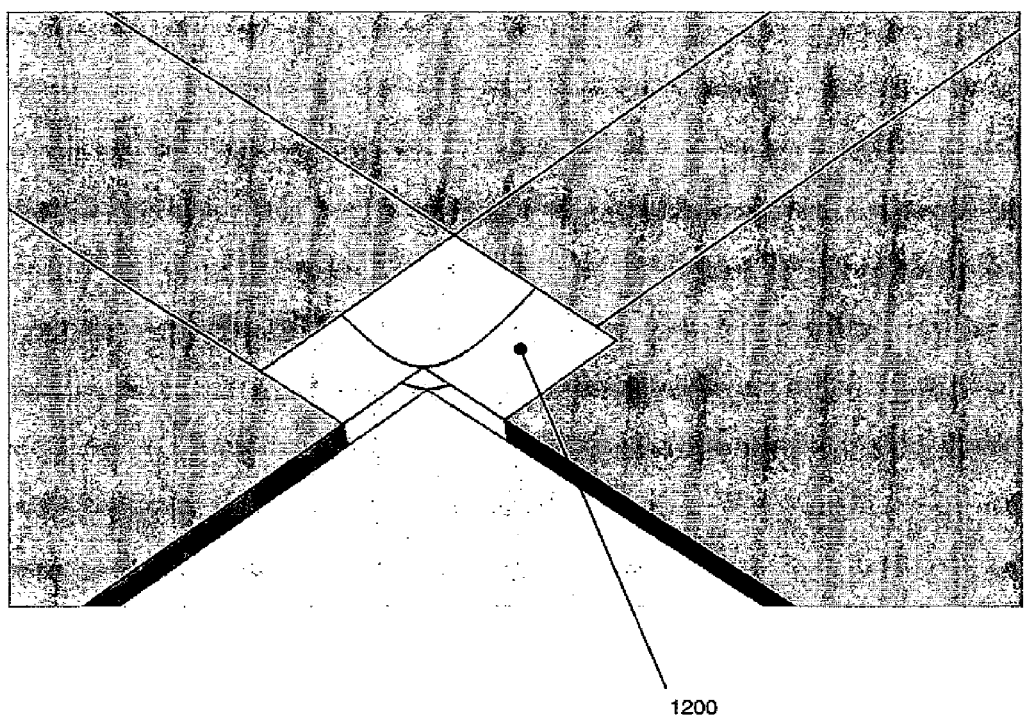
Fig. 12"

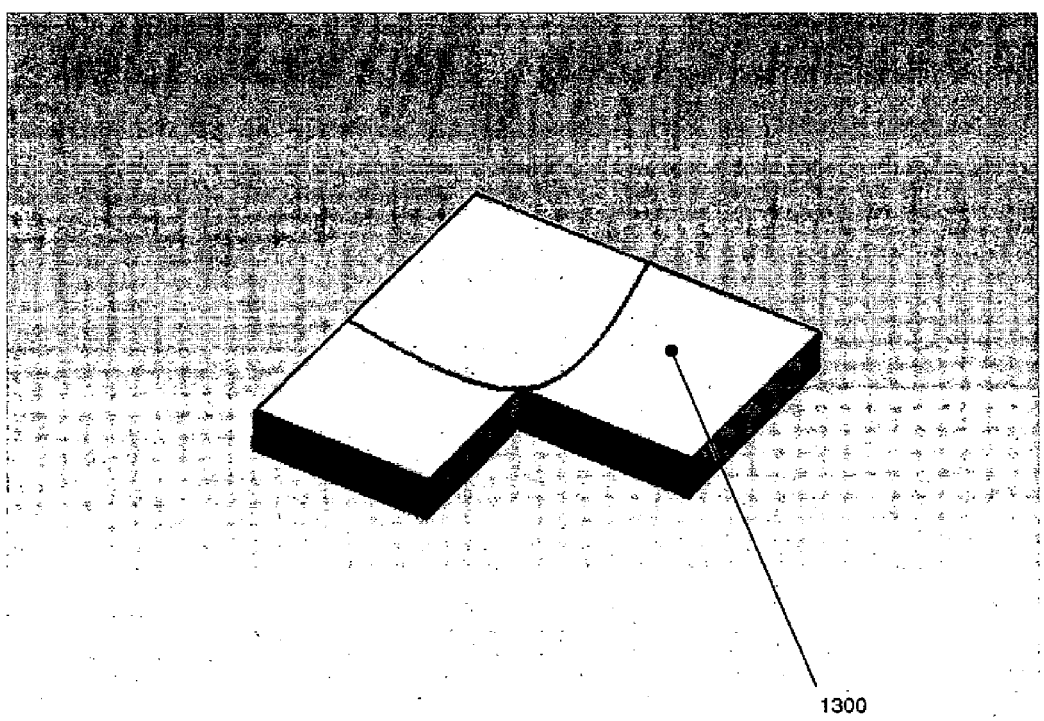
Fig. 13"

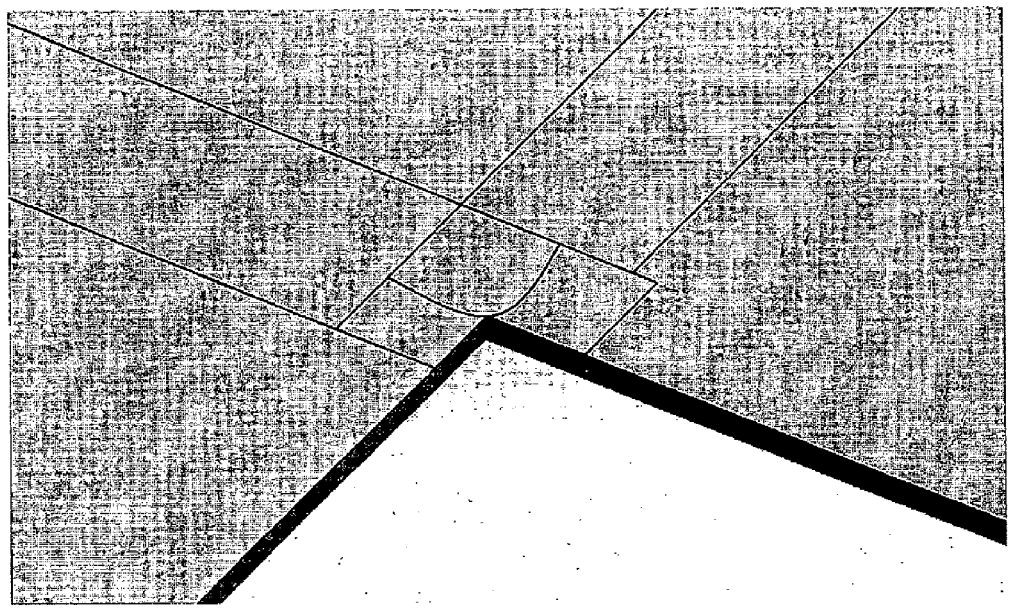
Fig. 14"

COMPUTATIONAL GEOMETRY DESIGN FOR SHEET METAL MACHINERY CORNER

PRIORITY OF APPLICATION

The present application claims priority of U.S. provisional application Ser. No. 60/609,777 filed Sep. 14, 2004, which is incorporated herein by reference.

TECHNICAL FIELD

This invention relates generally to three-dimensional sheet metal forming. More specifically, the invention relates to computational geometry design for sheet metal machinery corner.

BACKGROUND

The computer has greatly affected essentially all forms of graphical editing, including computer aided design and drafting (CAD). Some simpler geometric modeling computer program products are two dimensional, providing only length and width dimensions of objects, while more complex and powerful computer program products provide three dimensional editing and visualization.

Three dimensional CAD programs are also heavily utilized in computer aided manufacturing (CAM) to first create objects in three-dimensional computer space for testing and design validation before the objects are machined. In the CAD/CAM industry it is common to virtually design sheet metal with the ability to use tools like a bend operation to virtually fold or bend portions of the sheet metal object utilizing CAD programs like SolidEdge® or NX®, for example. Likewise, it is common for CAD programs to provide the designer the ability to use a "ClosedCorner" feature that modifies two flanges in one operation to close a corner where two flanges meet. The problem is features similar to Closed-Corner are limited to cylindrical surface extensions, to bends in the same direction, or corners without additional features, for example.

Following the bend operation, there is a need for the sheet metal CAD application to control the shape of the created corner so as to avoid the designer wasting a lot of material or having to re-work the piece altogether. There is also a need for a closed corner solution that can handle a range of different bend angles, and bend radii between two bend regions, including the case of creating corners between features bended in different directions.

SUMMARY

To achieve the foregoing, and in accordance with the purpose of the invention as broadly described herein, the present invention provides a method for creating a parametric corner on a three-dimensional design, comprising the steps of: associating a plurality of adjacent geometric members on a target body, calculating a plurality of mapped bend lines relative to said geometric members, connecting at least one parametric surface to said geometric members, and forming a machinery corner by sewing each of said parametric surfaces together, whereby a design feature can be successfully placed on said machinery corner. The associating a plurality of adjacent geometric members consists of creating a butt-joint. The associating a plurality of adjacent geometric members consists of creating a butt-joint between a first flange and a second flange and trimming at least one extrude. The calculating of said plurality of mapped bend lines is derived from a normal to a bend tangent line. The method further comprising the step of uniting said machinery corner to said target body. The method further connecting said at least one parametric surface to said geometric members, comprising the steps of: subdividing said parametric surface into a first surface portion and a second surface portion, forming a first B-surface constrained by at least one said mapped bend line and a geometric member common point on said first surface portion, and forming at least one B-surface on said second surface portion. Each of said geometric members is in one of a formed state, an unformed state and a formed-unformed state. At least two of said geometric members contain a plurality of discrete parameters. At least two of said geometric members contain a plurality of discrete parameters, wherein each of said geometric members are in one of a formed state, an unformed state and a formed-unformed state. At least two of said geometric members contain a plurality of discrete parameters, wherein said plurality of discrete parameters contain at least one of a bend angle, a bend radii, a corner angle, and a bend direction. The mapped bend lines subdivide at least one side bend face on one of said geometric members. The parametric corner has a top parametric surface and a bottom parametric surface. The second surface portion of said parametric surface has two B-surfaces.

Additionally, another advantage of the present invention provides a computer-program product tangibly embodied in a machine readable medium to perform a method for creating a parametric corner on a three-dimensional design, comprising: instructions for associating a plurality of adjacent geometric members on a target body, instructions for calculating a plurality of mapped bend lines relative to said geometric members, instructions for connecting at least one parametric surface to said geometric members, and instructions for forming a machinery corner by sewing each of said parametric surfaces together, whereby a design feature can be successfully placed on said machinery corner. The associating said plurality of geometric members consists of trimming at least one extrude. The computer-program product further comprising instructions for uniting said machinery corner to said target body. The computer-program product further comprising: instructions for subdividing said parametric surface into a first surface portion and a second surface portion, instructions for forming a first B-surface constrained by at least one said mapped bend line and a geometric member common point on said first surface portion, and instructions for forming at least one B-surface on said second surface portion. wherein said three-dimensional design is a sheet metal design. Each of said geometric members are in one of a formed state, an unformed state and a formed-unformed state. At least two of said geometric members contain a plurality of discrete parameters. At least two of said geometric members contain a plurality of discrete parameters, wherein each of said geometric members are in one of a formed state, an unformed state and a formed-unformed state. At least two of said geometric members contain a plurality of discrete parameters, wherein said plurality of discrete parameters contain at least one of a bend angle, a bend radii, a corner angle, and a bend direction. The mapped bend lines subdivide at least one side bend face on one of said geometric members. The said parametric corner has a top parametric surface and a bottom parametric surface. The said second surface portion of said parametric surface has two B-surfaces.

A further advantage of the present invention provides a method for creating a parametric corner having a top parametric surface and a bottom parametric surface on a sheet metal design, comprising the steps of: associating a plurality of adjacent geometric members on a target body by trimming at least one extrude, wherein each of said geometric members are in one of a formed state, an unformed state and a formed-unformed state, having a plurality of discrete parameters, wherein said plurality of discrete parameters contain at least one of a bend angle, a bend radii, a corner angle, and a bend direction, calculating a plurality of mapped bend lines relative to said geometric members, wherein said mapped bend lines subdivide at least one side bend face on one of said geometric members, connecting at least one parametric surface to said geometric members, comprising the steps of: subdividing said parametric surface into a first surface portion and a second surface portion, forming a first B-surface constrained by at least one said mapped bend line and a geometric member common point on said first surface portion, and forming at least one B-surface on said second surface portion, and forming a machinery corner by sewing each of said parametric surfaces together, and uniting said machinery corner to said target body, whereby a design feature can be successfully placed on said machinery corner.

A realized advantage is parameterization for feature on feature functionality is constrained mapping between the unformed and form states, and vice versa. Boundary conditions between 3 top or bottom machinery corner faces and bend faces will be taken into account. Top faces and bottom faces of the current state of machinery corner tool body will be stored as a latent tool body. Another advantage is the lack of central rail edge, which removes the prior problems of mapping a form/unformed bend operation to a feature inserted on the machinery corner.

Further advantages of the present invention will be set forth in part in the description and in the drawings that follow, and, in part will be learned by practice of the invention.

The present invention will now be described with reference made to the following Figures that form a part hereof, and which is shown, by way of illustration, an embodiment of the present invention. It is understood that other embodiments may be utilized and changes may be made without departing from the scope of the present invention.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENTS

I. Hardware/Software Environment

Figure 1:
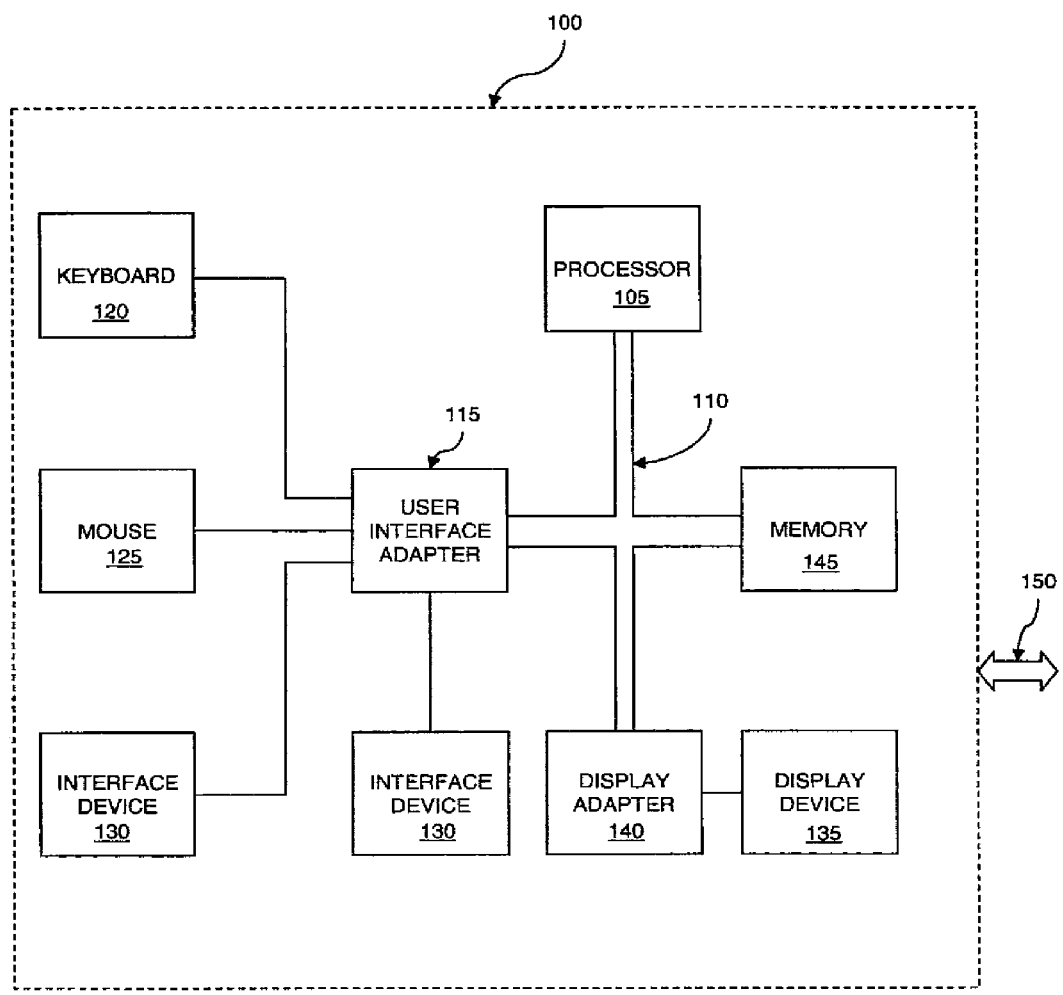
FIG. 1, is a block diagram of a computer environment in which the present invention may be practiced.
Figure 2A:
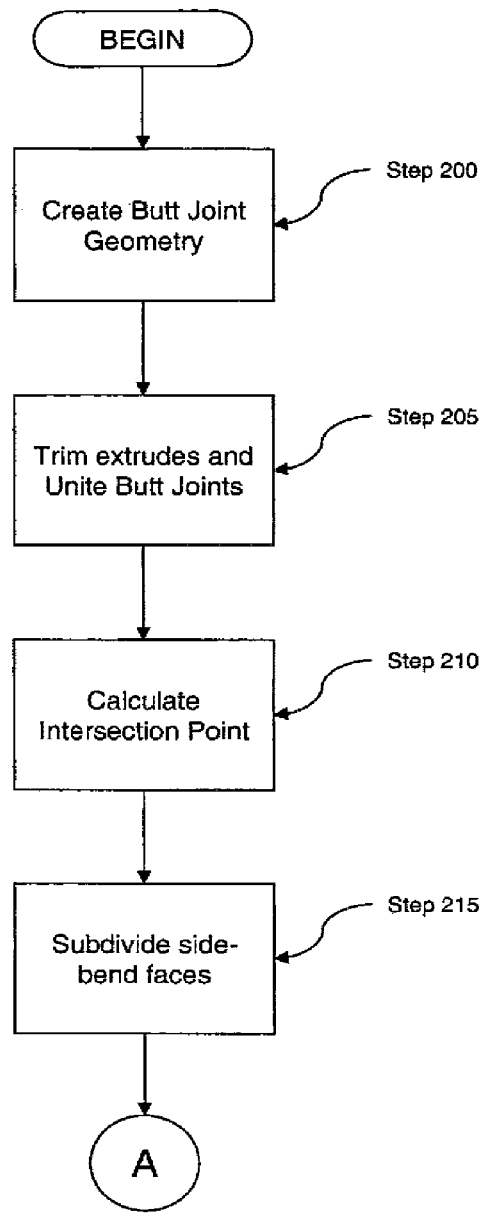
FIGS. 2a-2d, is a flow chart for the machinery corner function.
Figure 2B:
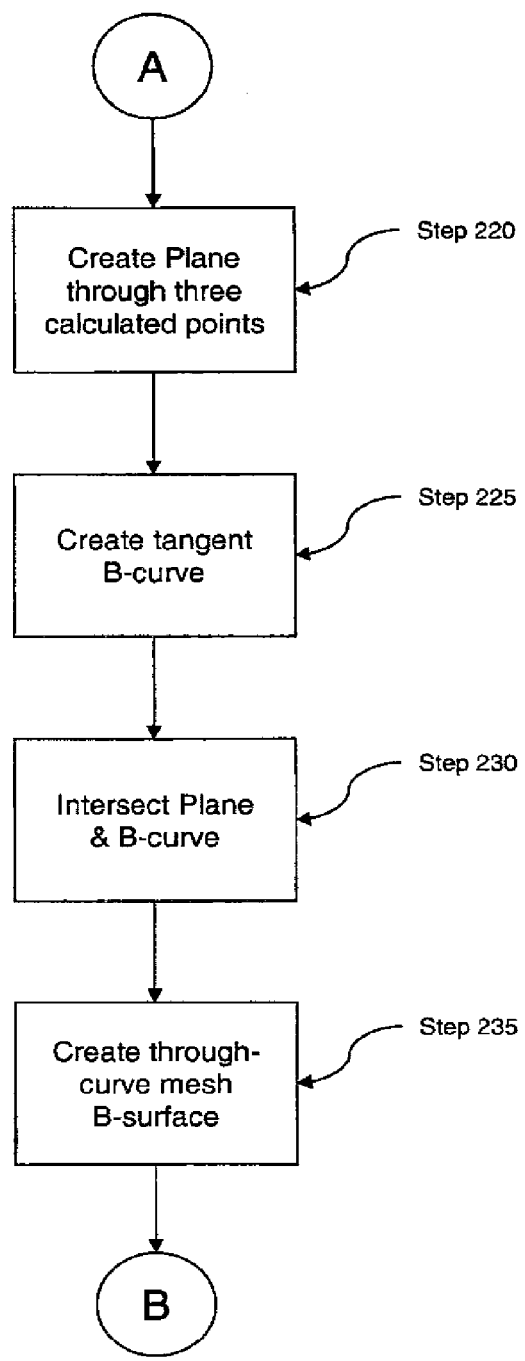
Figure 2C:
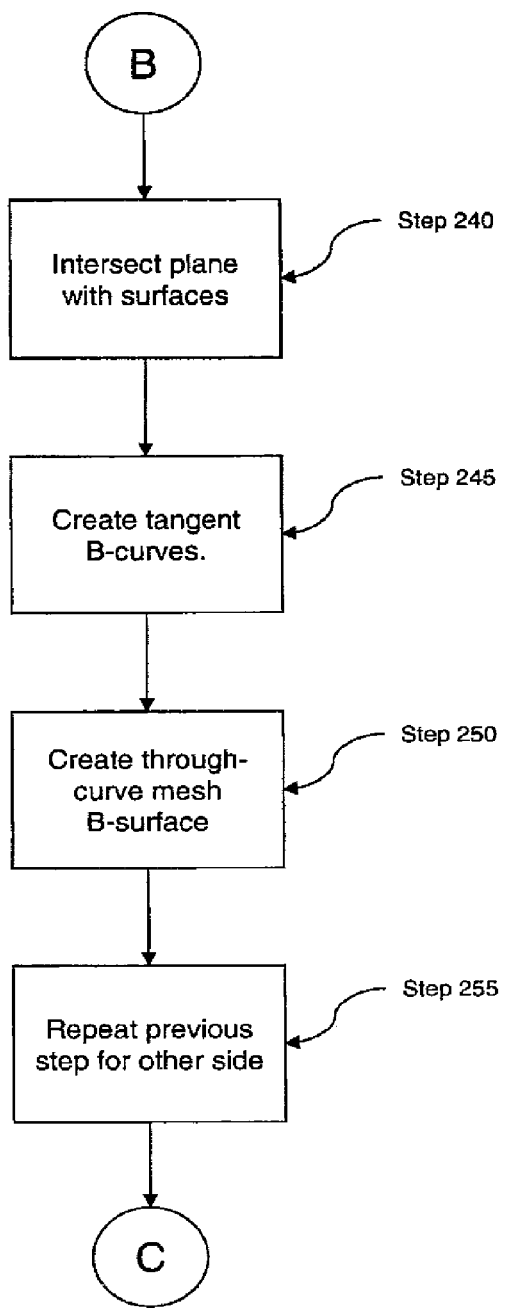
Figure 2D:
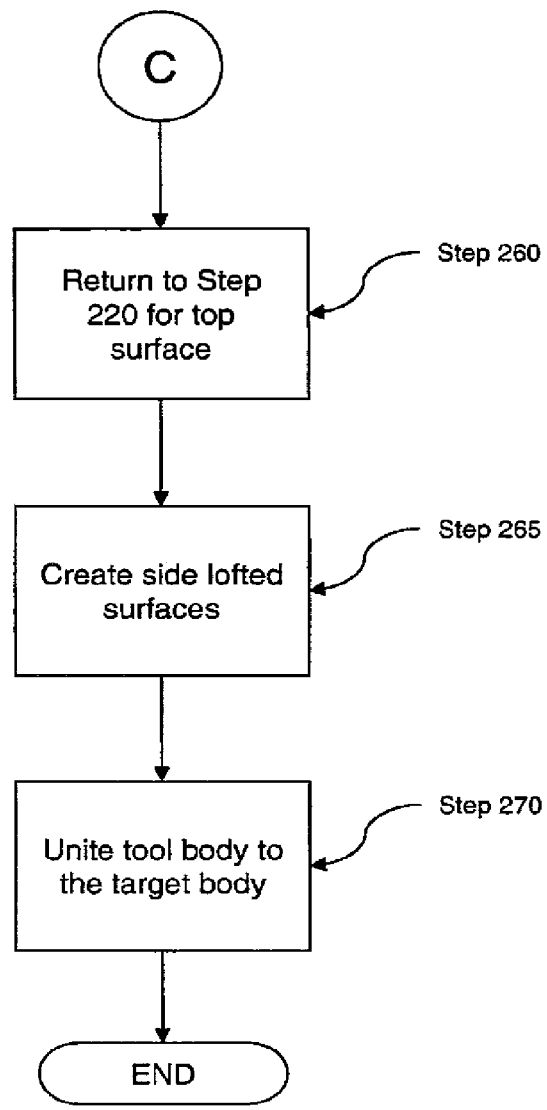

The present invention may be performed in any of a variety of known computing environments. The environment of FIG. 1 comprises a representative conventional computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The computer 100 typically includes a user interface adapter 115, which connects the microprocessor 105 via the bus 110 to one or more interface devices, such as a keyboard 120, mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to memory 145, which can include ROM, RAM, etc.

The computer 100 communicates via a communications channel 150 with other computers or networks of computers. The computer 100 may be associated with such other computers in a local area network (LAN) or a wide area network (WAN), or it can be a client in a client/server arrangement with another computer, etc. All of these configurations, as well as the appropriate communications hardware and software, are known in the art.

Software programming code that embodies the present invention is typically stored in a memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

II. Machinery Corner Function

The preferred embodiment is practiced using a machinery corner function for creating a parametric corner between adjacent geometries, e.g. two flanged geometries, with a variety of different parameters, where those parameters can be bend angles, bend radii, corner angle, and bend direction, for example. Turning now to the figures, wherein like numerals indicate like or corresponding parts throughout the several views, the machinery corner function will be described using the steps from FIGS. 2a-2d and illustrated by FIG. 3 through FIG. 14, where the plain figure number illustrates both sides formed, the figure number with a single prime illustrates one side formed and one side unformed, and the figure number with a double prime illustrates both sides unformed.

Figure 3:
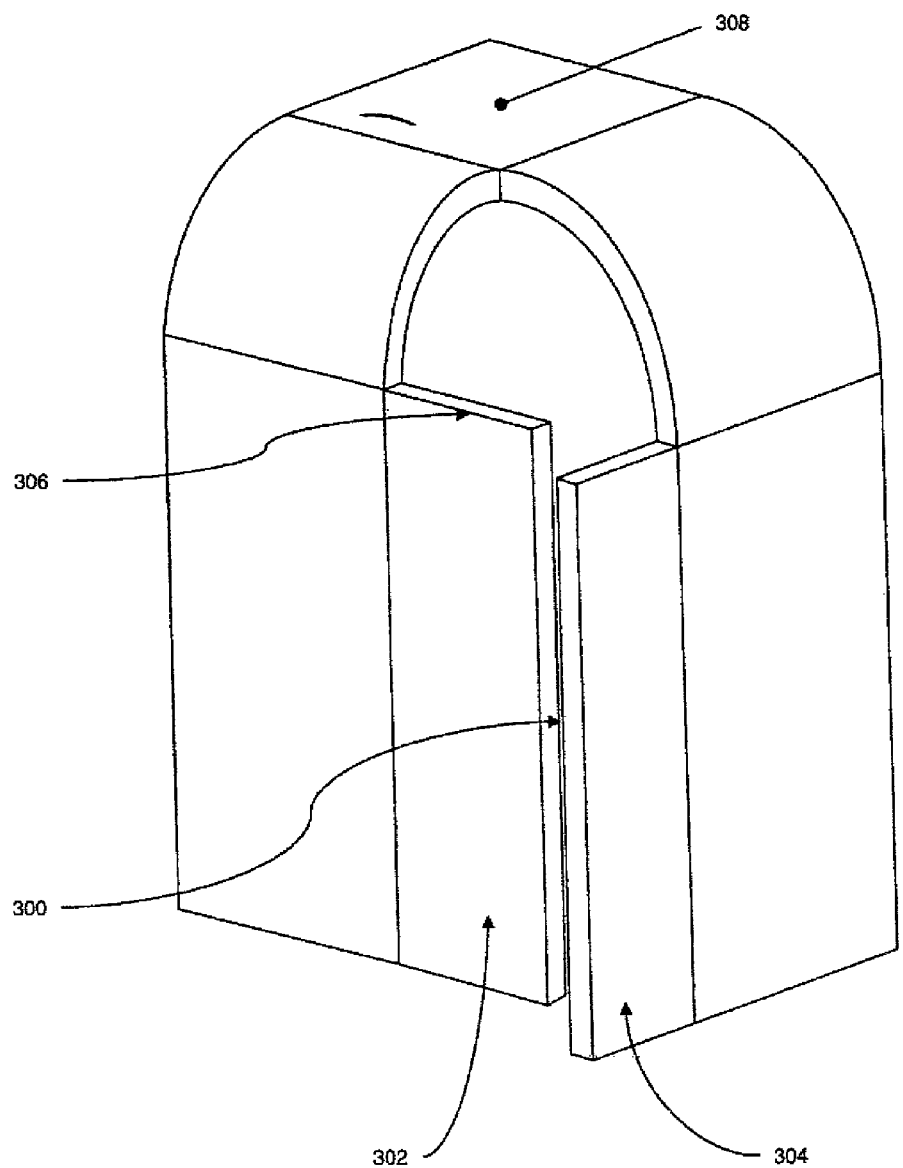
FIG. 3, illustrates Step 200.
Figure 3:
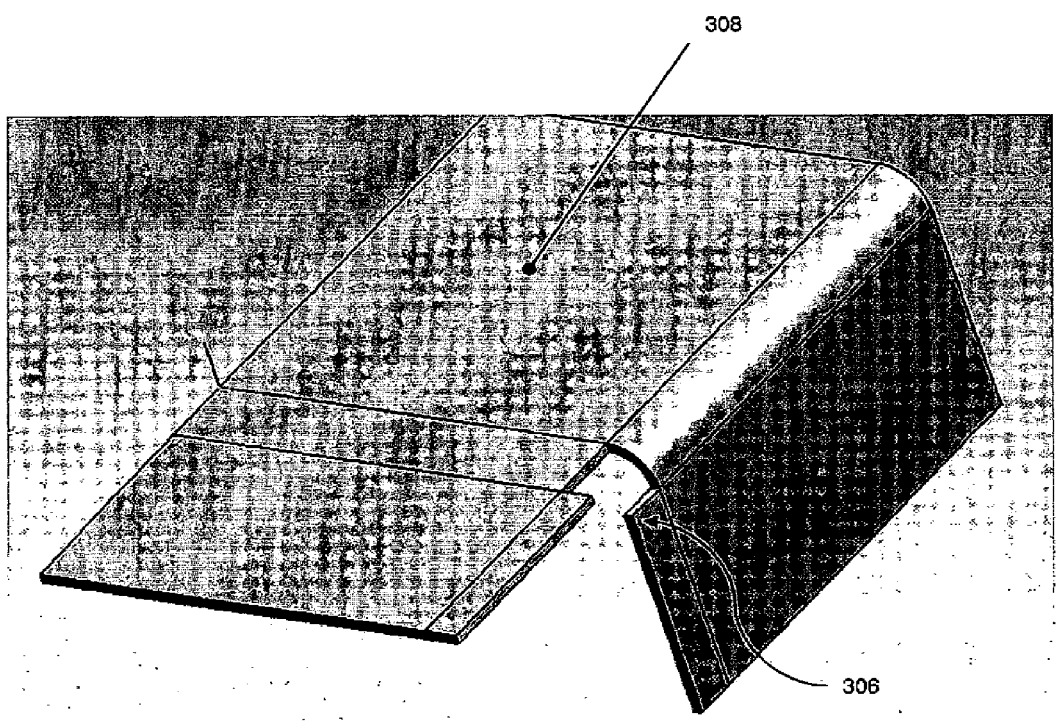
Figure 4:
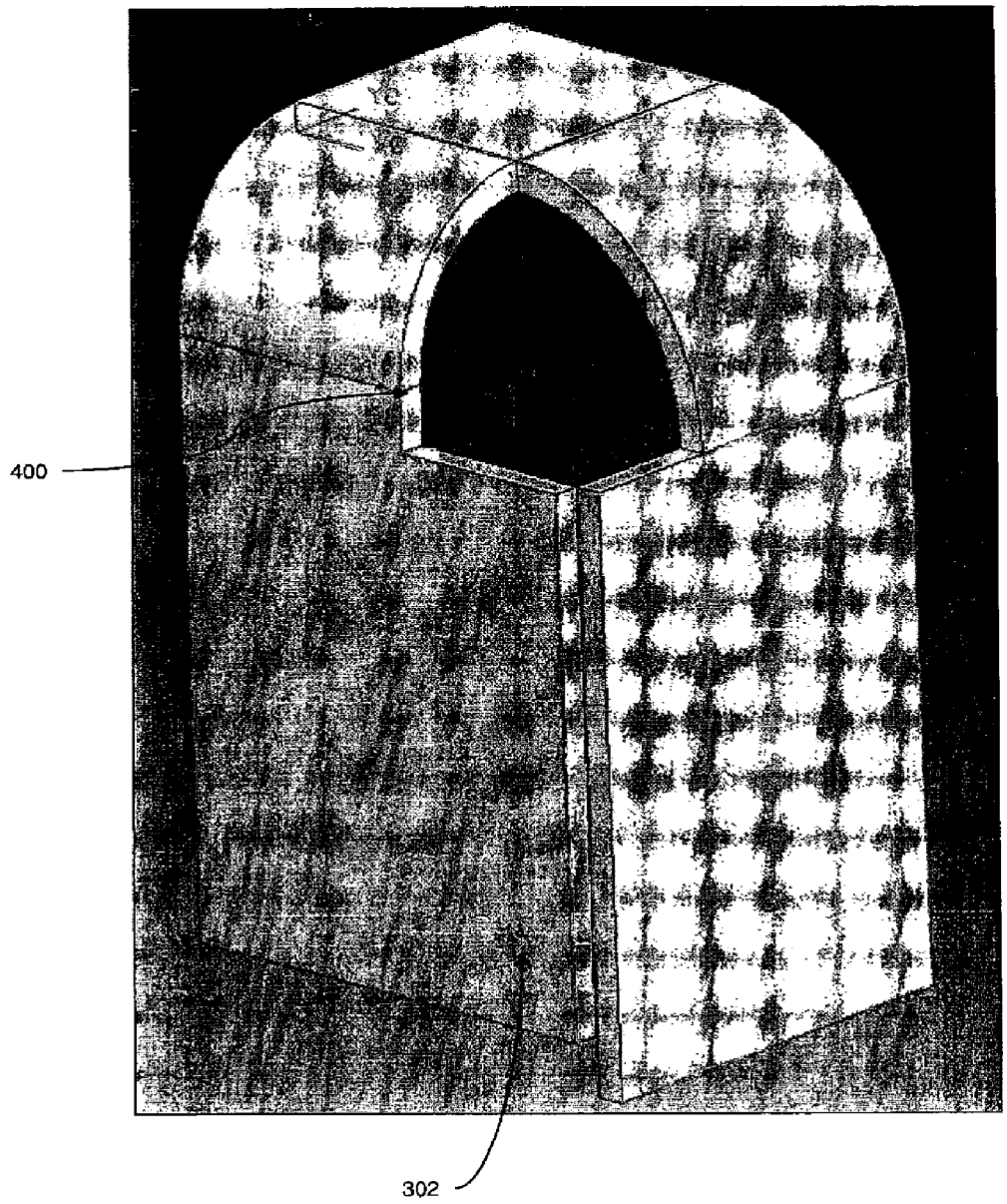
FIG. 4, illustrates Step 205.
Figure 4:
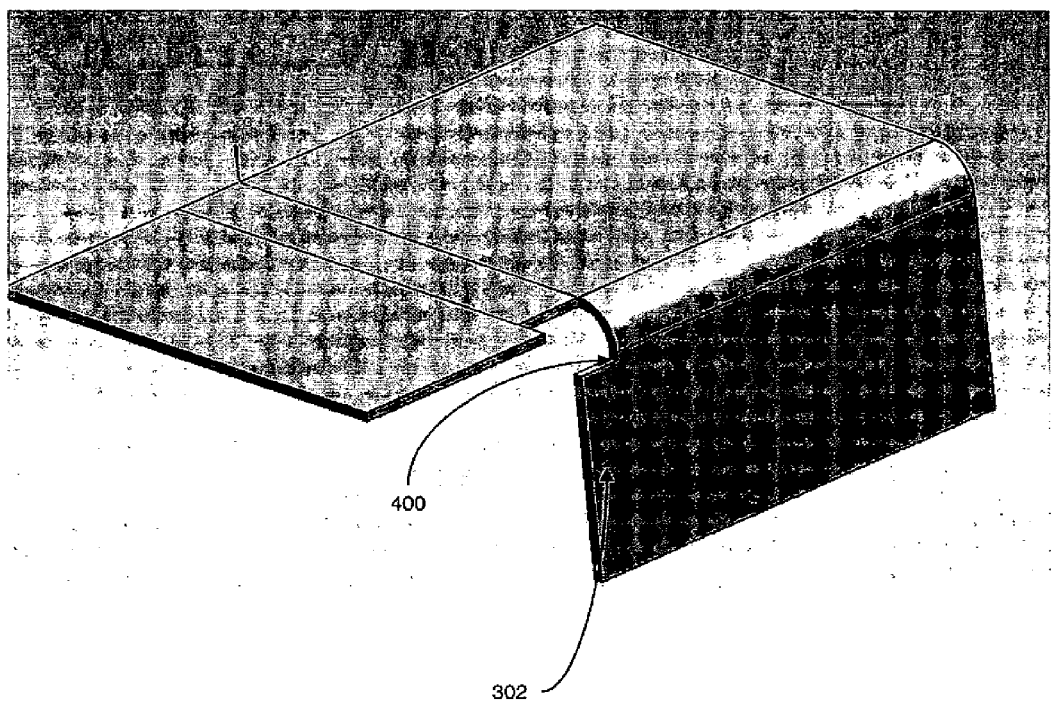

Beginning with FIG. 3, where two flanges of different radius are both bent down at ninety degrees and the designer intends to create a machinery corner, the function starts associating the geometries by creating a butt-joint geometry 300 with a gap equal to one modeling tolerance (Step 200). Butt-joints are commonly understood in the sheet metal industry and will not be explained further. The difference in height between the flanges that meet at the butt-joints is not illustrated in FIG. 3' and FIG. 3", but the higher flange butt-joint is located on an associate flange 302, and the lower flange butt-joint is located on a parent flange 304. At this point, the machinery corner, i.e. tool body, is not united to a target body 308, and will not be united until the completion of the process step. To complete the geometry association, the function next operates to trim the associate flange 302 and the parent flange 304 to the same height (Step 205), or also referred to as trimming an extrude 306, where the extrude 306 is the higher portion of the butt-joint geometry 300, the result of which is indicated by the presence of a prior height mark 400 on the associate flange 302.

Figure 5:
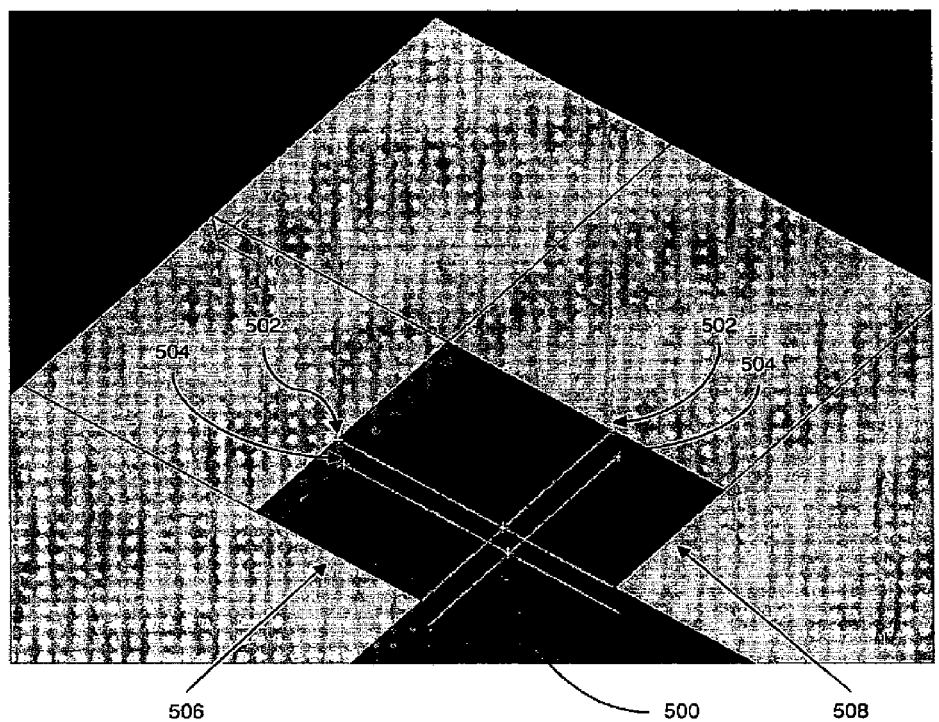
FIG. 5, illustrates Step 210.
Figure 6:
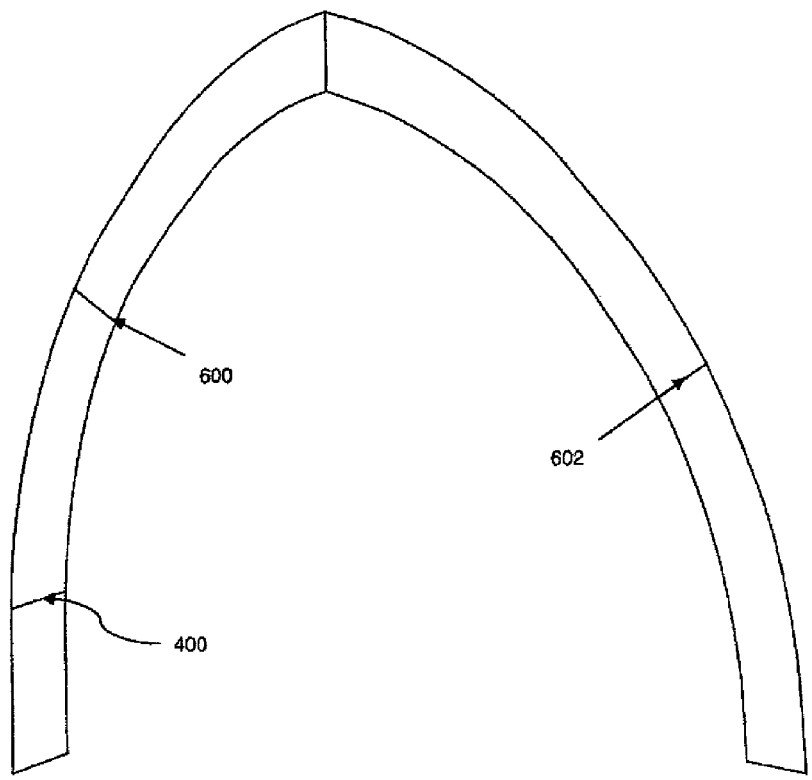
FIG. 6, illustrates Step 215.
Figure 6:
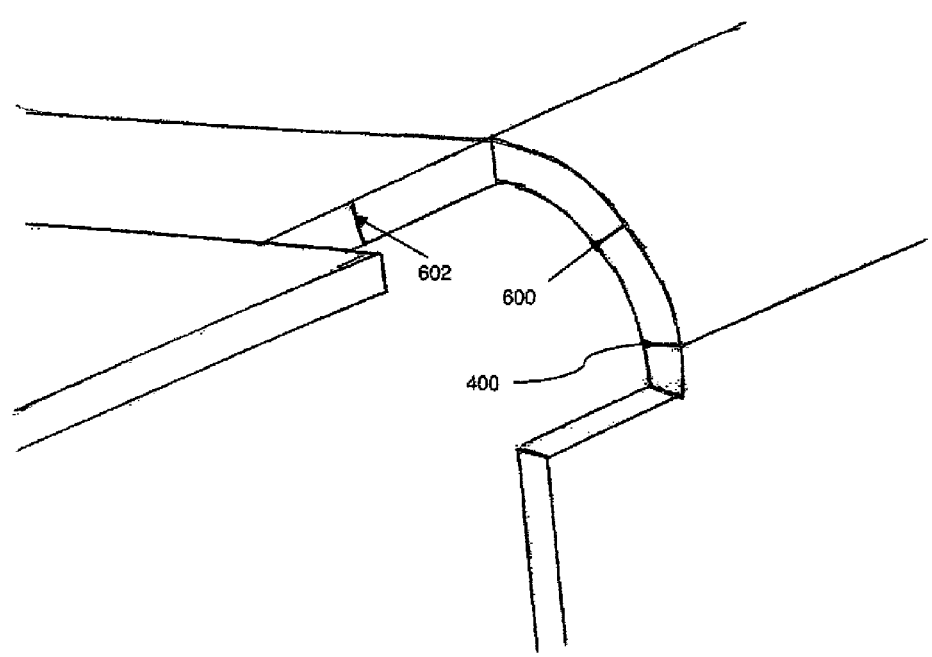
Figure 7:
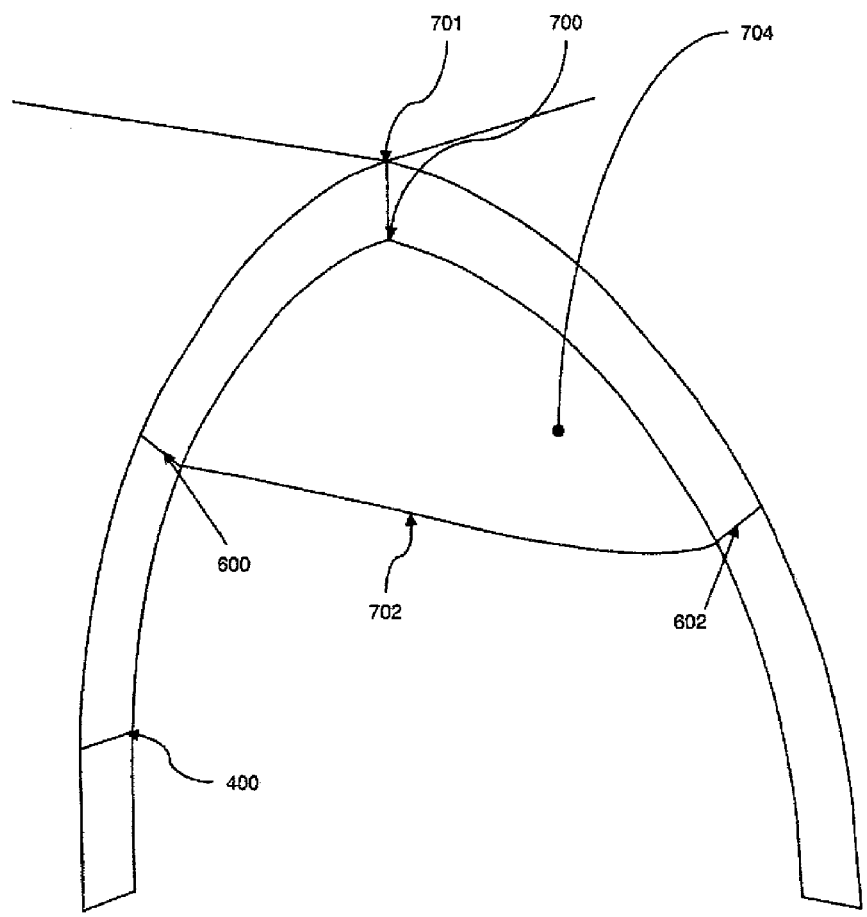
FIG. 7, illustrates Step 235.
Figure 7:
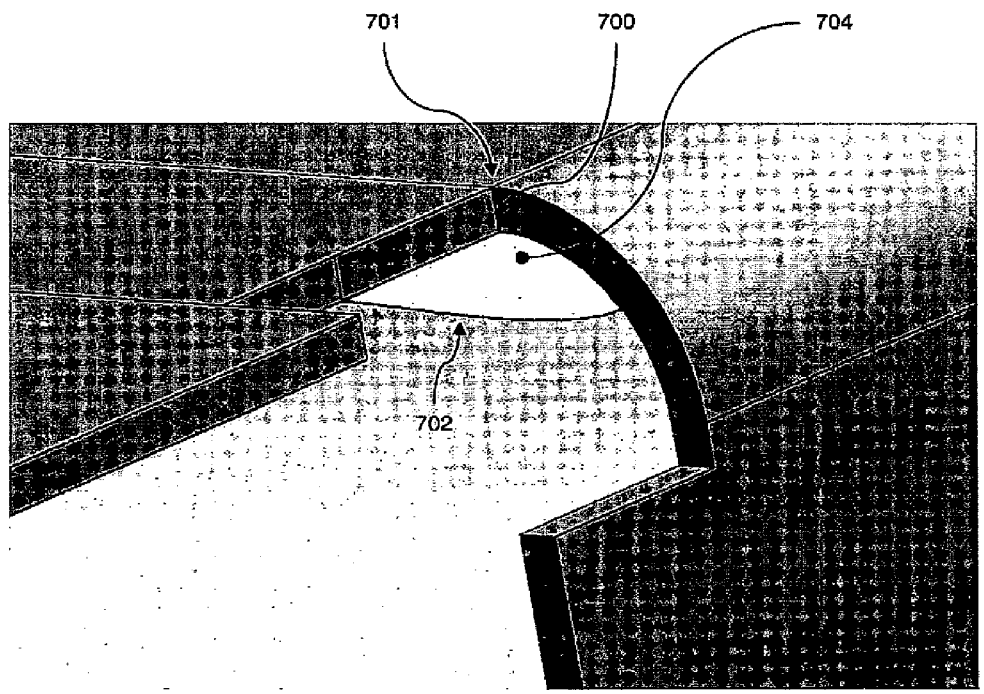
Figure 8:
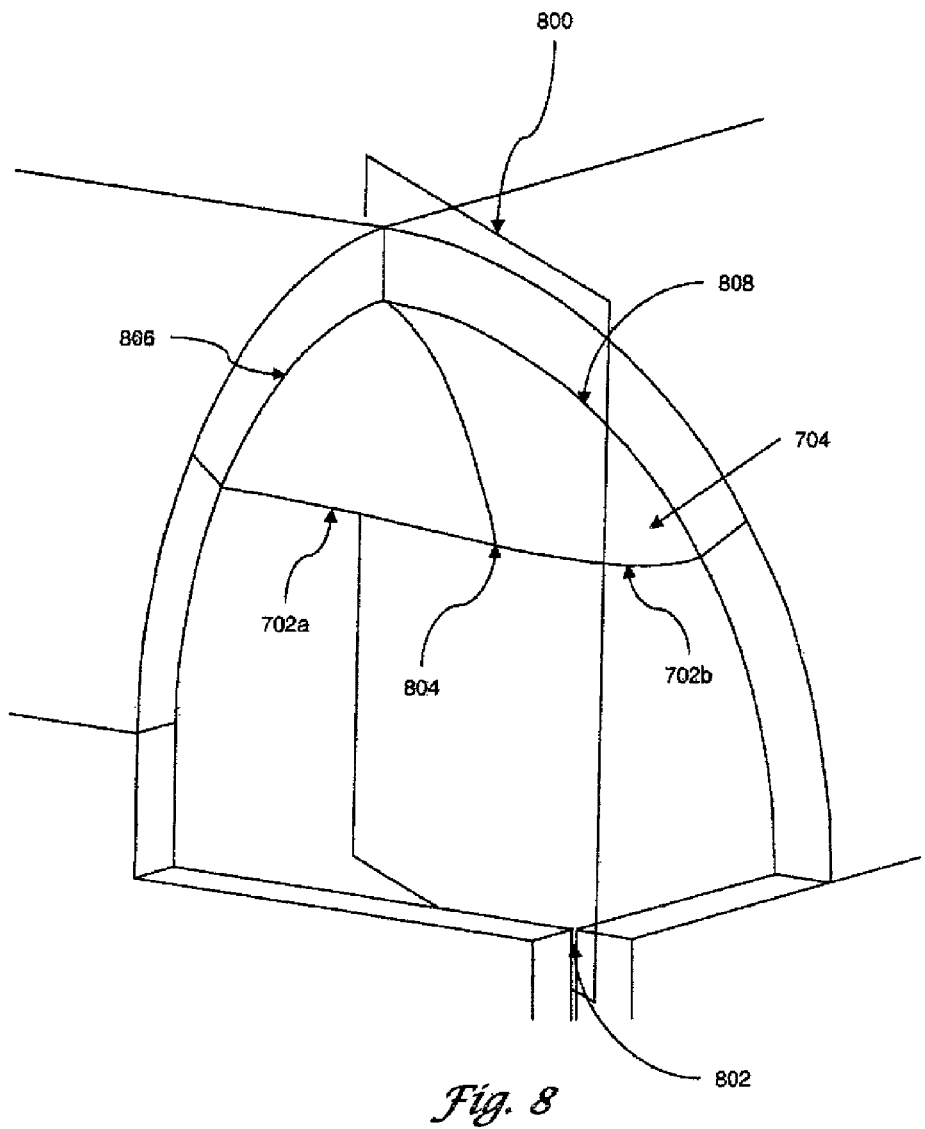
FIG. 8, illustrates Step 240.
Figure 8:
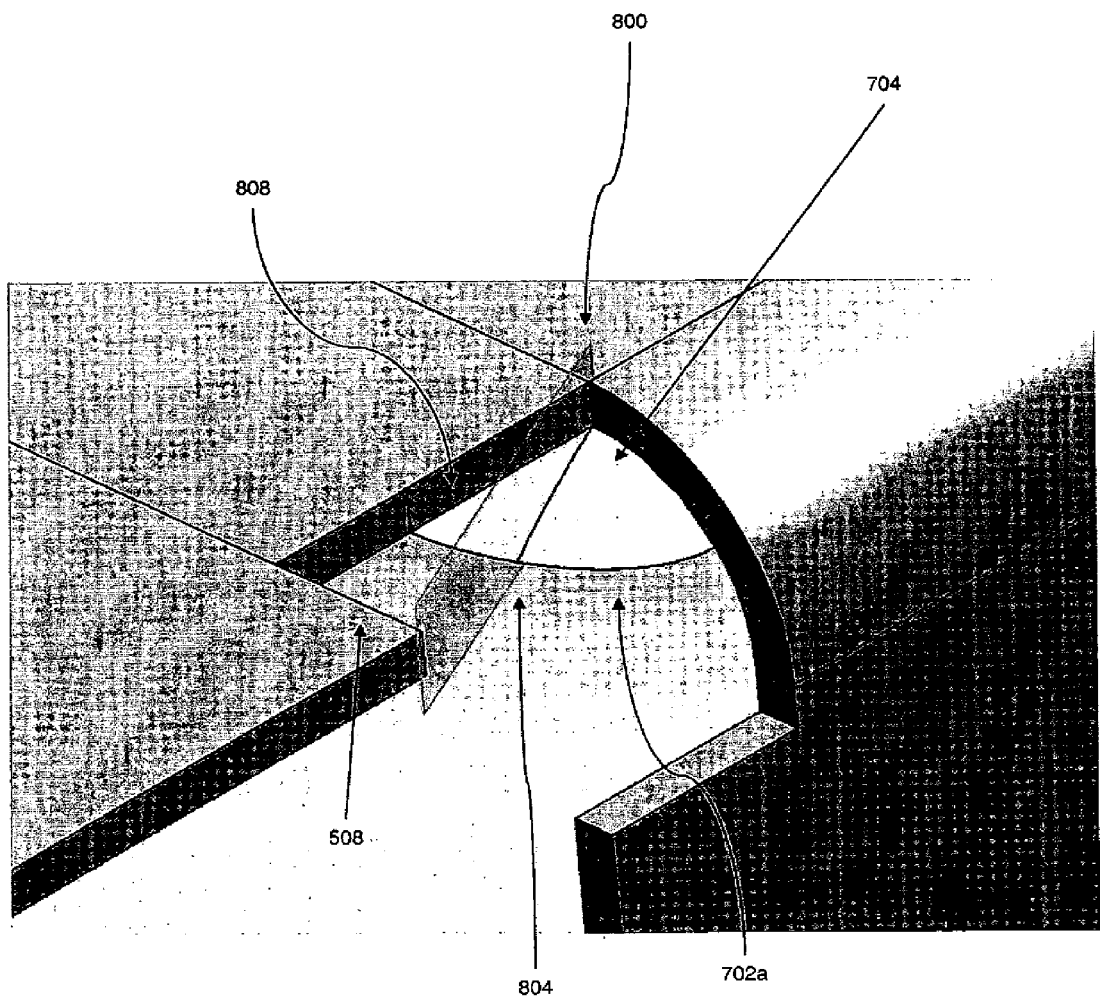
Figure 9:
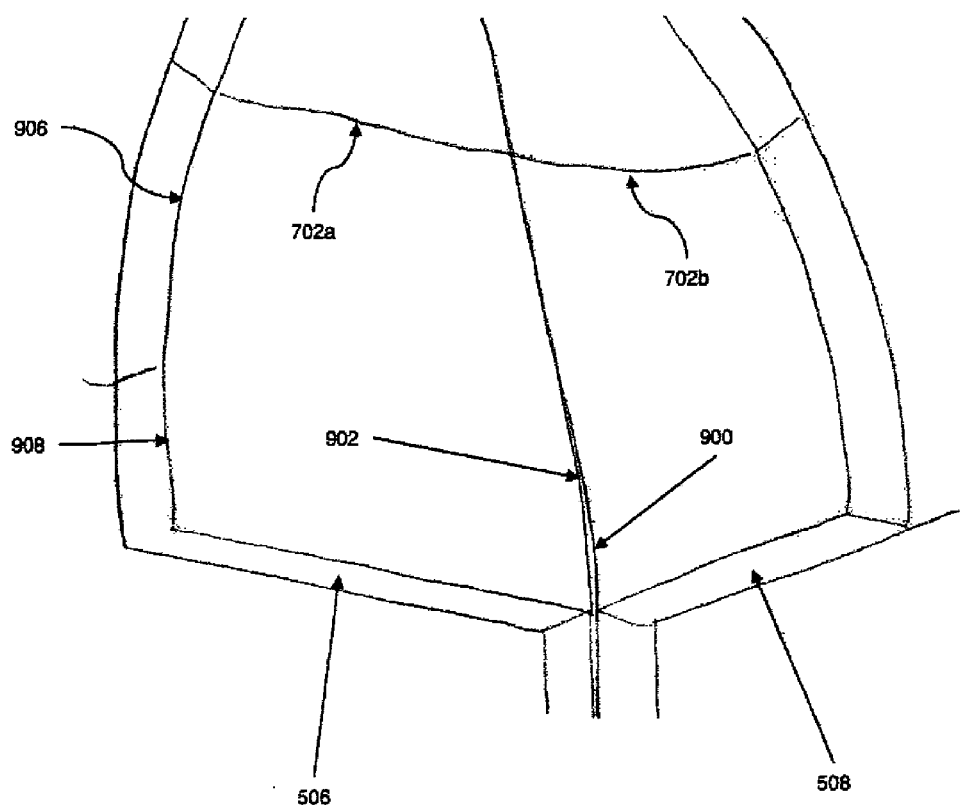
FIG. 9, illustrates Step 245.
Figure 9:
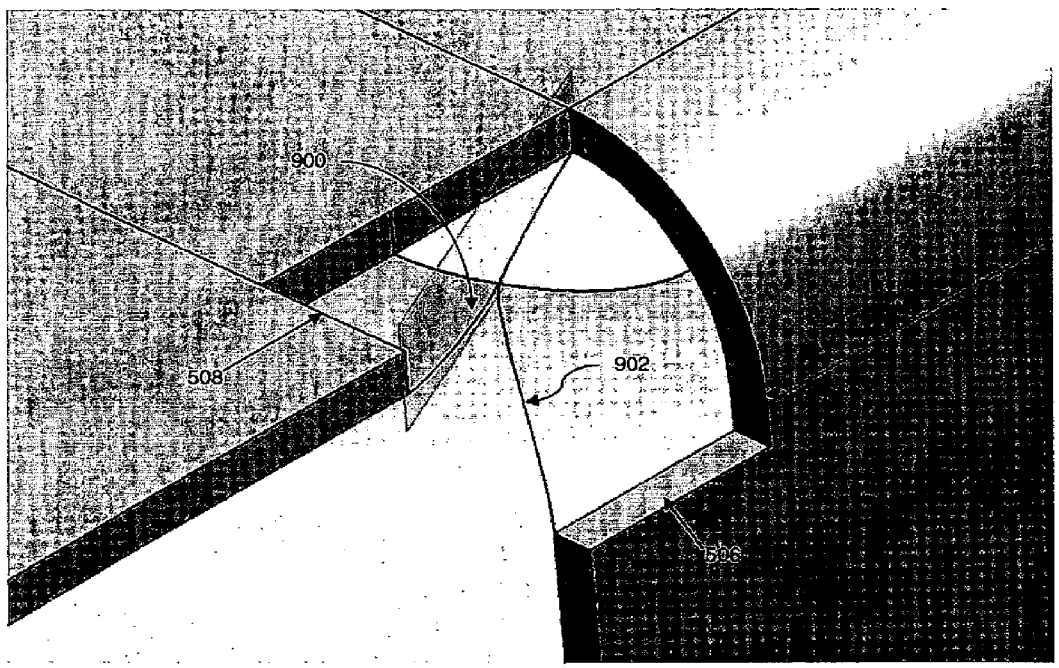
Figure 10:
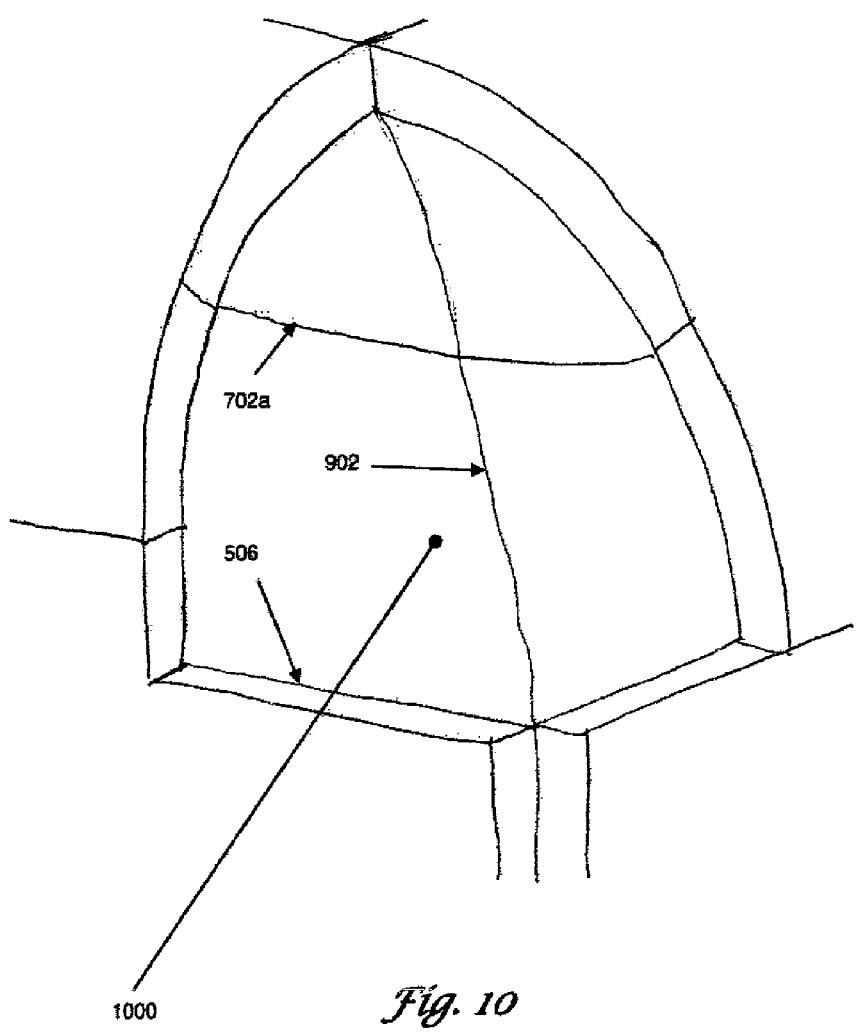
FIG. 10, illustrates Step 250.
Figure 10:
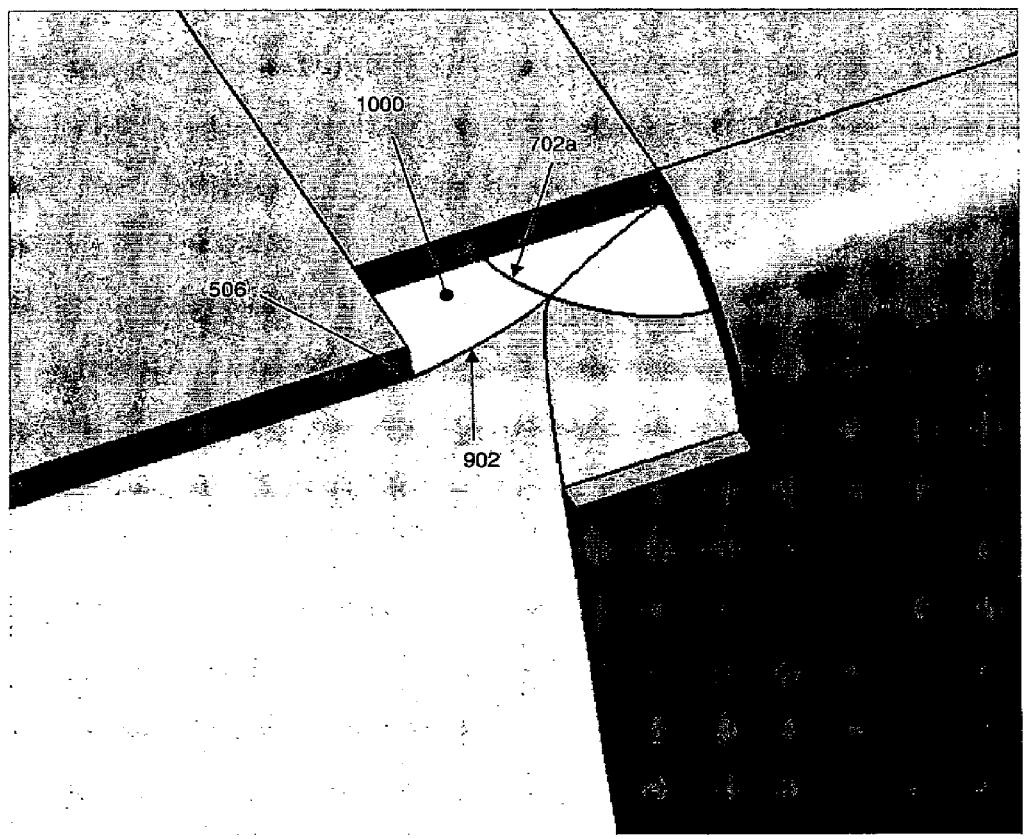

Next the function calculates an intersection point 500 from a normal to an associate bend tangent line 506 and a parent bend tangent line 508, where the bend tangent lines are extended from the associate flange 302 and the parent flange 304, respectively (Step 210), as illustrated in FIG. 5 and FIG. 5'. A top point 502 and a bottom point 504 connect the parent flange 304 and the associate flange 302 and are calculated in the unformed state. Lines that start with the intersection point 500 and are parallel to the bend tangent lines (or cylindrical axis) intersect the side edges of both ends. The two lines that connect the top point 502 and bottom point 504 create a parent mapped bend line 600 and an associate mapped bend line 602, as illustrated in FIG. 6, FIG. 6', and FIG. 6", that subdivides the parent and associate faces (Step 215), respectively.

Create a plane 800 through a first point 700 a second point 701 and a common-edge vertex 802, where the common-edge vertex 802 is the intersection of the extended butt-joint surfaces (Step 220). Then create a bottom B-curve 702, where the bottom B-curve 702 subdivides the parametric surface into two surface portions, a first surface portion and a second surface portion. The bottom B-curve 702 is tangentially constrained to the parent bend tangent line at the parent mapped bend line 600 and the associate bend tangent line at the associate mapped bend line 602 (Step 225). Next intersect the plane 800 and the bottom B-curve 702, and then split the bottom B-curve 702 (creating a first half B-curve 702a and a second half B-curve 702b) at an intersection point 804 (Step 230). Through the bottom B-curve 702 create a mesh B-surface 704 on the first surface portion. The mesh B-surface 704 creation is composed of a primary curve and a cross curve. The primary curves consists of an associate bend side curve 806 and the second half B-curve 702b. And the cross curves consist of a parent bend side curve 808 and the opposite portion of the first half B-curve 702a, while using tangency to constrain the two adjacent faces (Step 235).

To form additional B-surfaces on a second surface portion of the parametric surface (Step 240) with intersecting the plane 800 (illustrated in FIG. 9') having the mesh B-surface 704 created (Step 235), the function then creates an associate B-curve 902 and a parent B-curve 900 between the associate bend tangent line 506 and the parent bend tangent line 508 and two intersection curves, where the intersection curves are the first half B-curve 702a and the second half B-curve 702b, respectively (Step 245). The function creates a mesh B-surface 1000 using the first half B-curve 702a and the associate bend tangent line 506 for the primary curve, and the associate B-curve 902, and a first associate side curve 906 and a second associate side curve 908 as the cross curve, while using tangency constrains to the three adjacent faces (Step 250).

Figure 11:
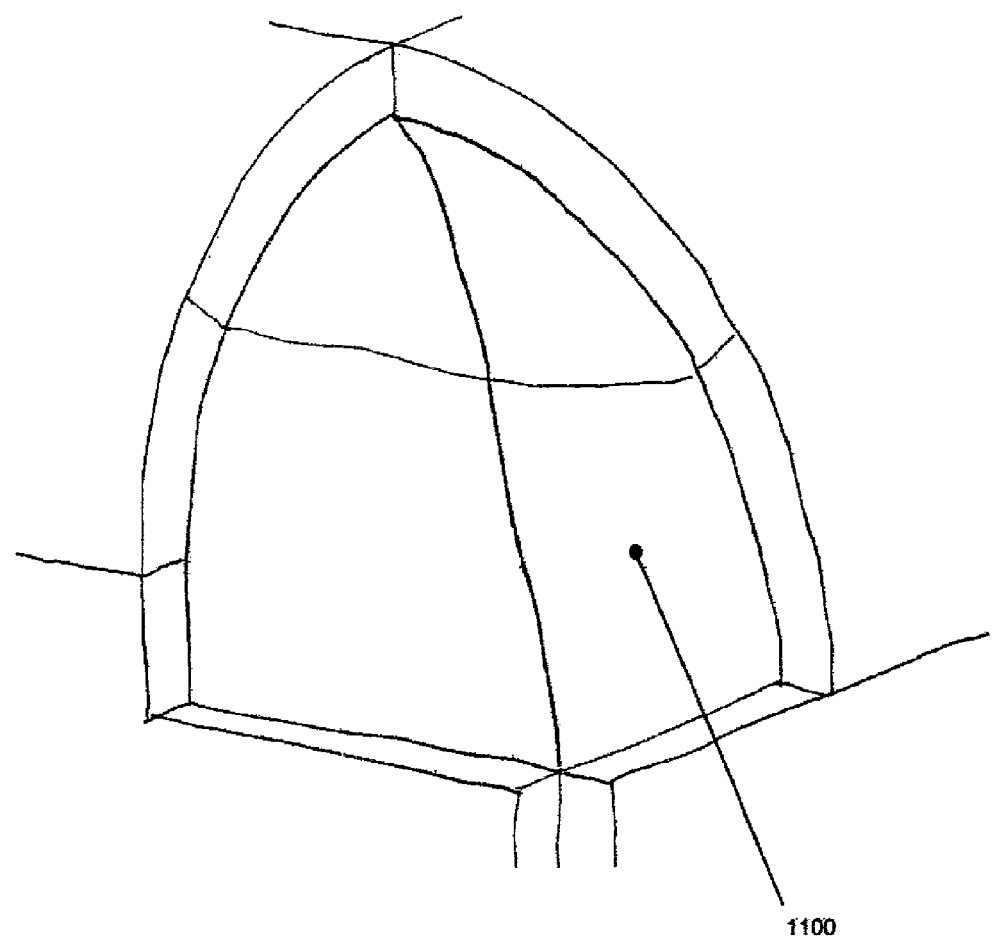
FIG. 11, illustrates Step 255.
Figure 11:
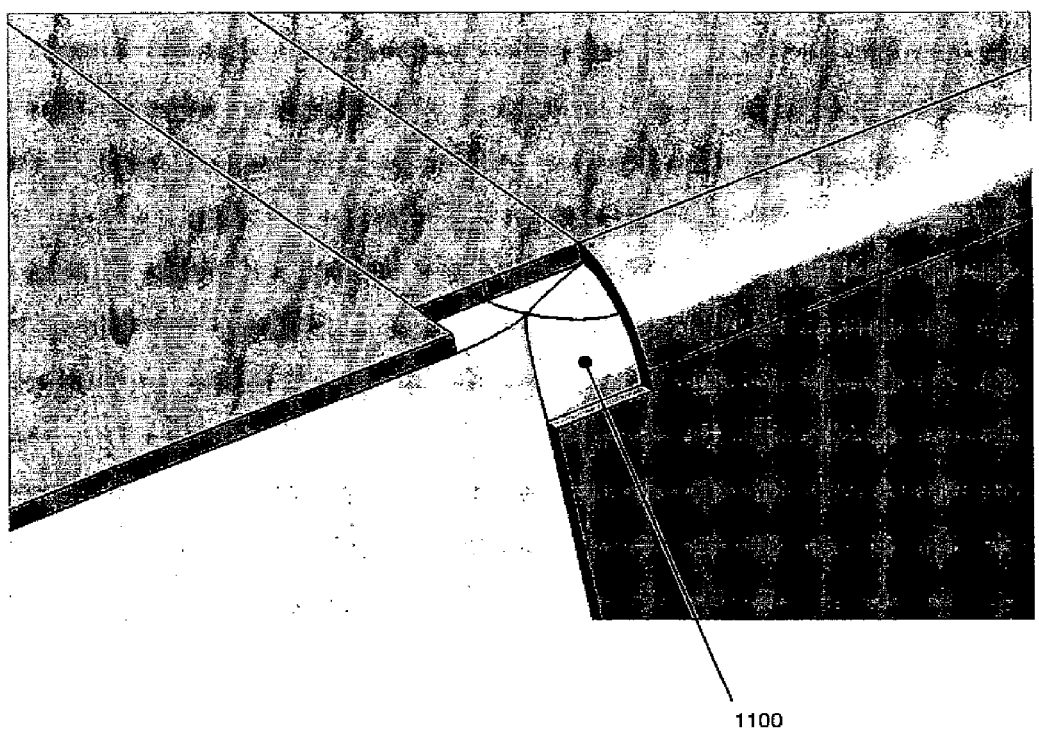
Figure 11:
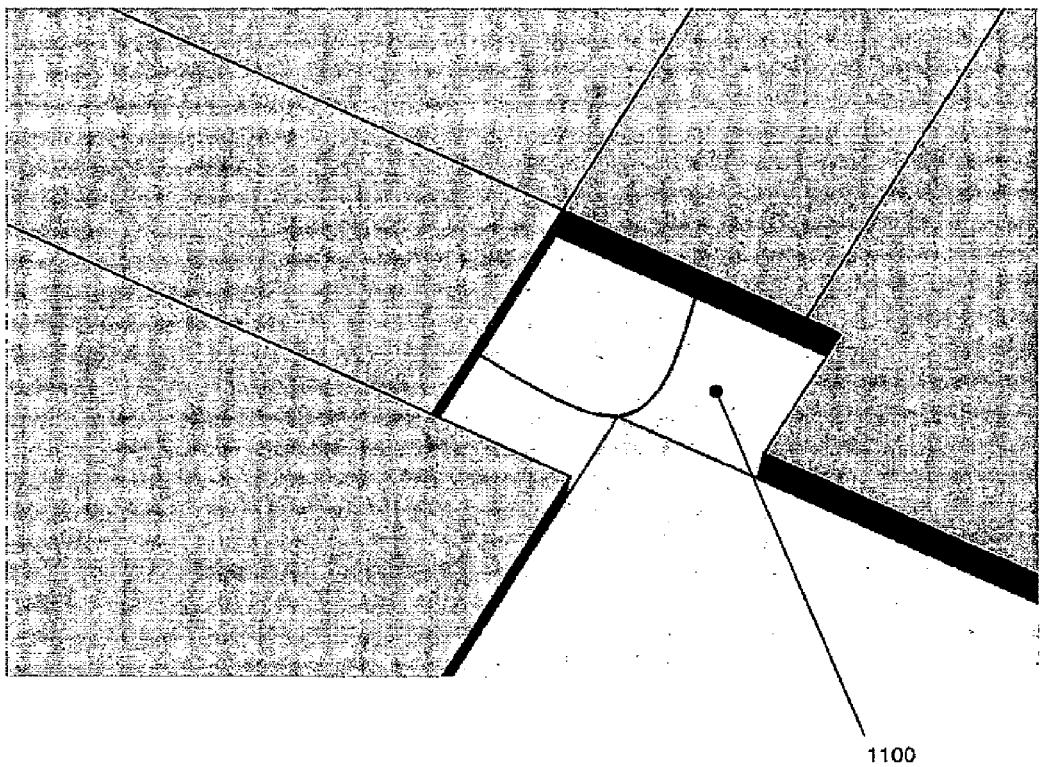
Figure 12:
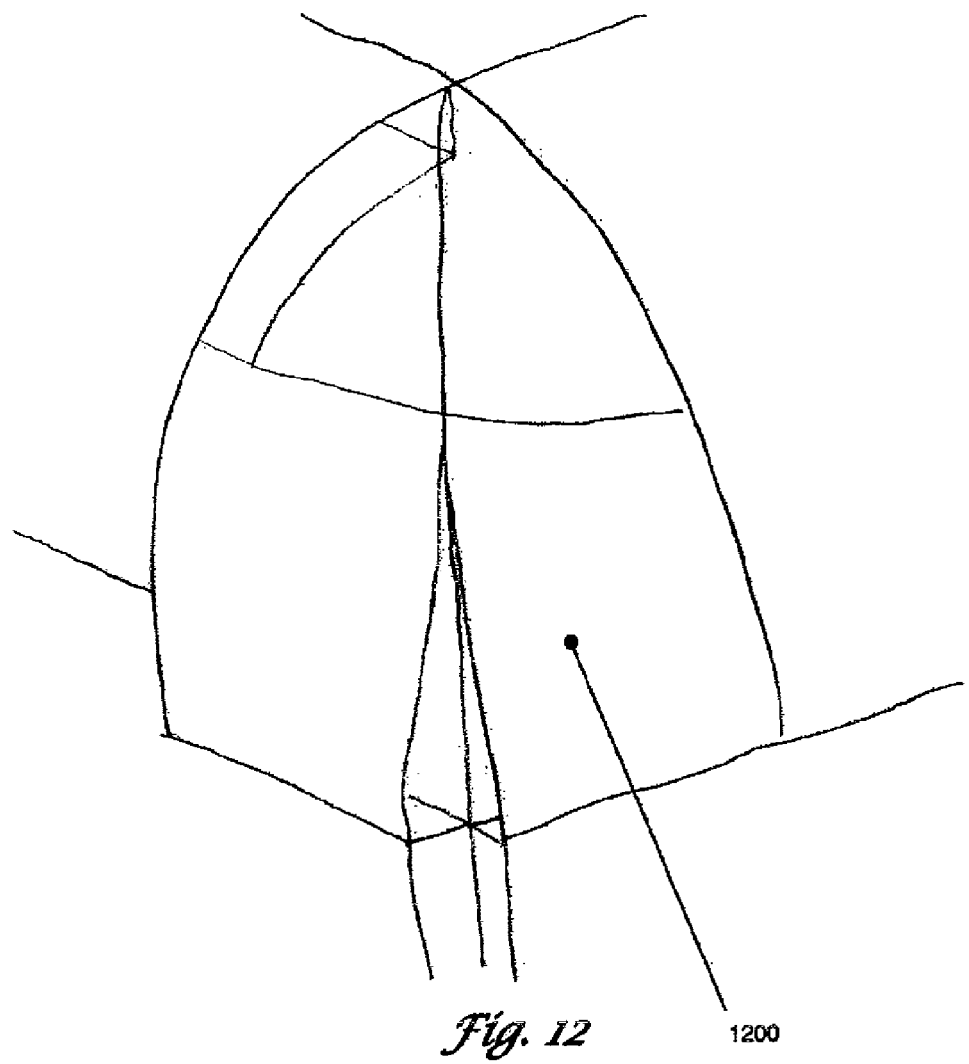
FIG. 12, illustrates Step 260.
Figure 12:
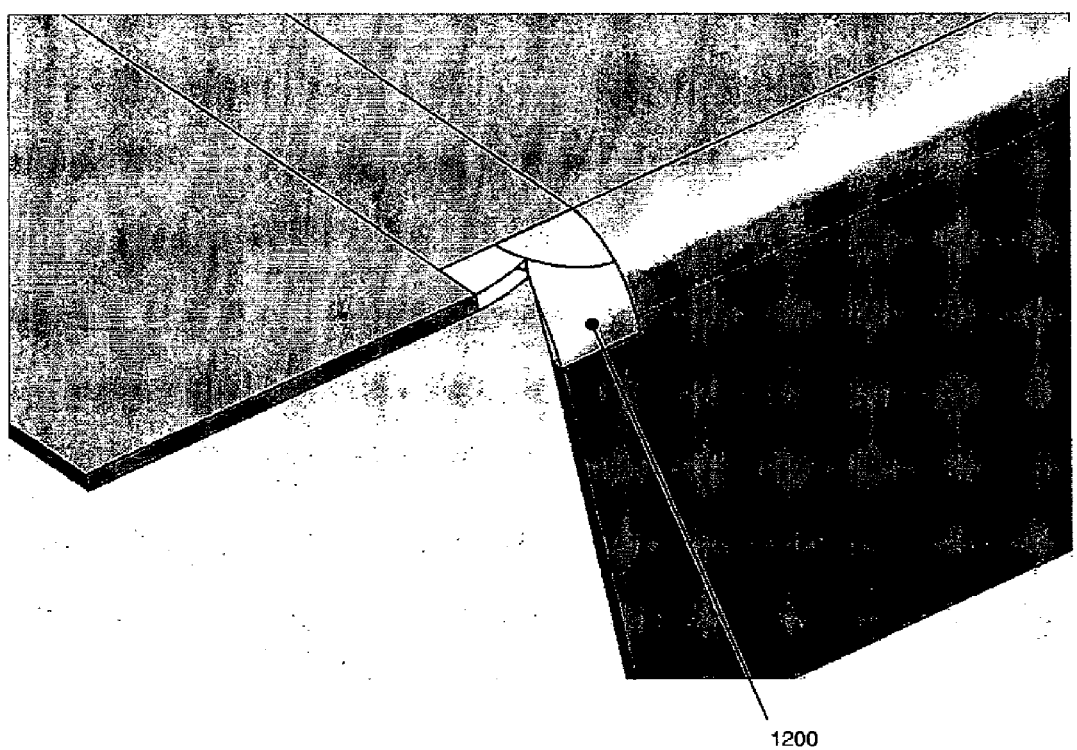
Figure 13:
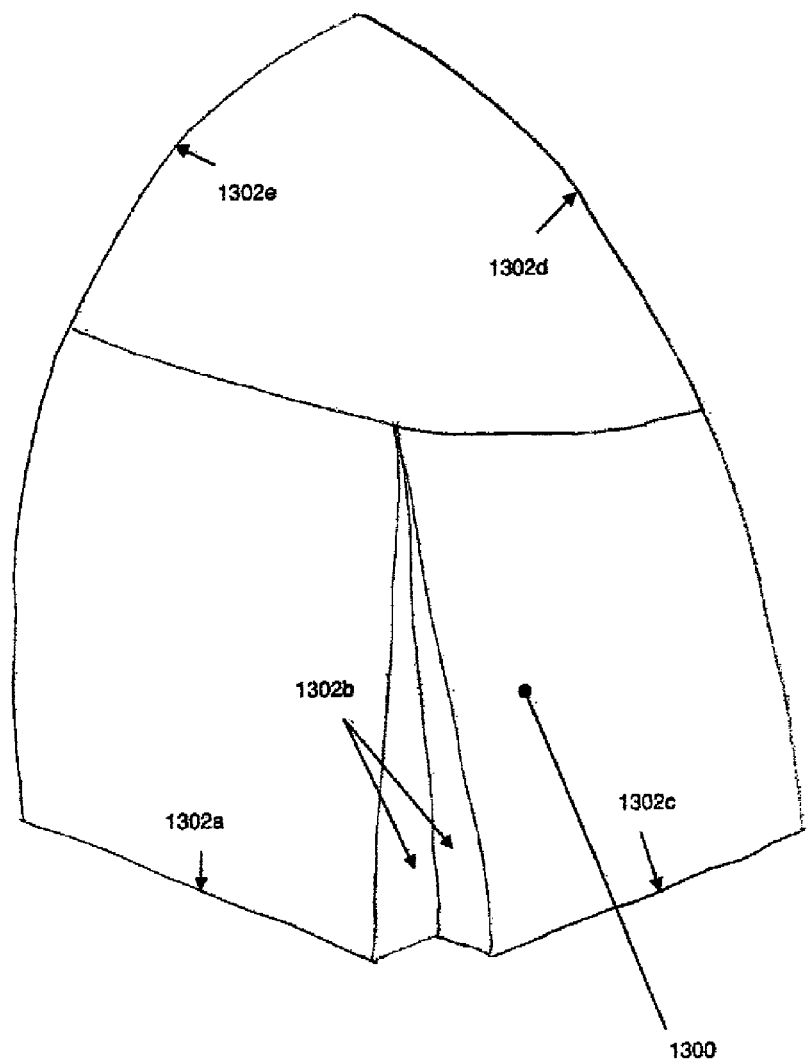
FIG. 13, illustrates Step 265.
Figure 13:
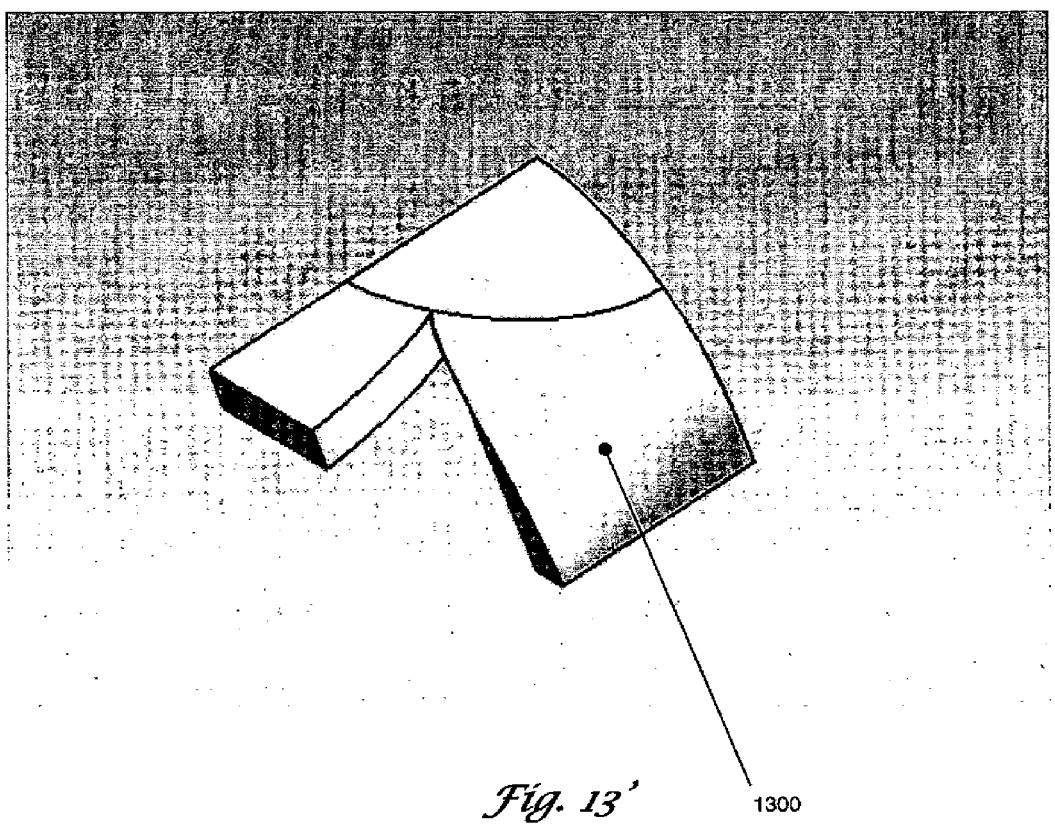

To complete the second surface portion of the machinery corner with the function disclosed, repeat Step 250 to form another B-surface on the other side, shown at 1100, (Step 255) for the result shown in FIGS. 11-11". Repeat Step 220 through Step 255 to create the remaining B-surfaces for a top side 1200 as shown in FIGS. 12-12" (Step 260). After all top and bottom parametric surfaces are created, the function creates lofted surfaces 1302a, 1302b, 1302c, 1302d, and 1302e (Step 265) connecting multiple edges of the parametric surfaces, and sews all faces into a solid tool body 1300, illustrated in FIGS. 13-13". Finally, the solid tool body 1300 is united to the target body 308 (Step 270).

Figure 14:
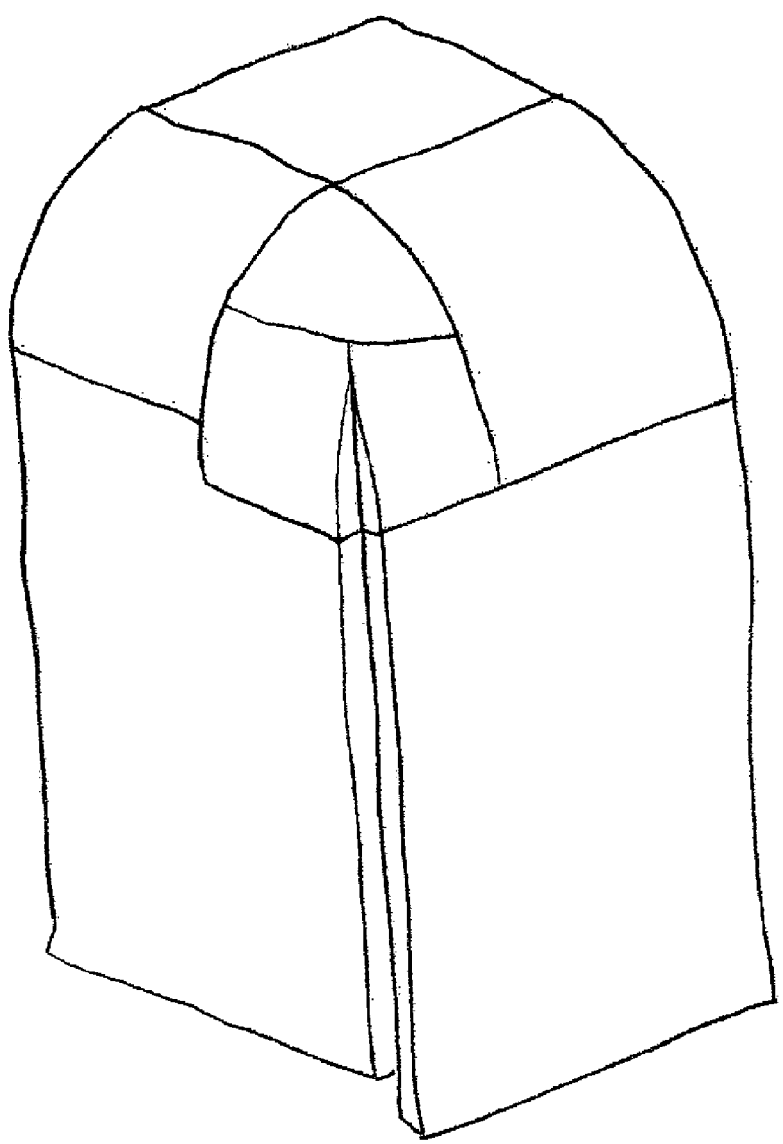
FIG. 14, illustrates Step 270.
Figure 14:
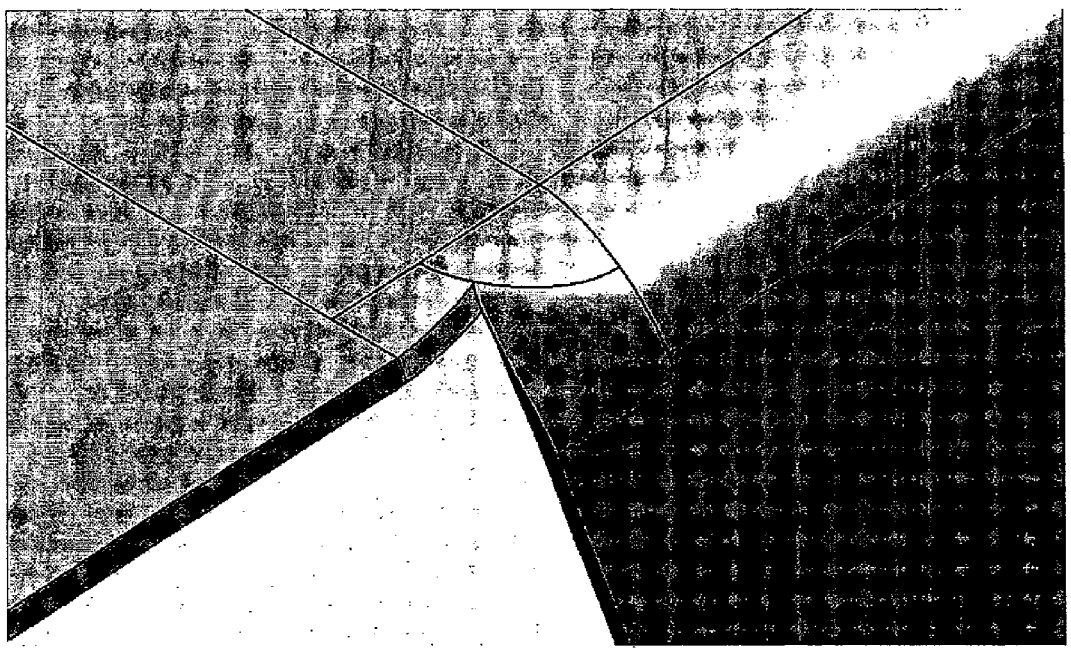
Figure 15:
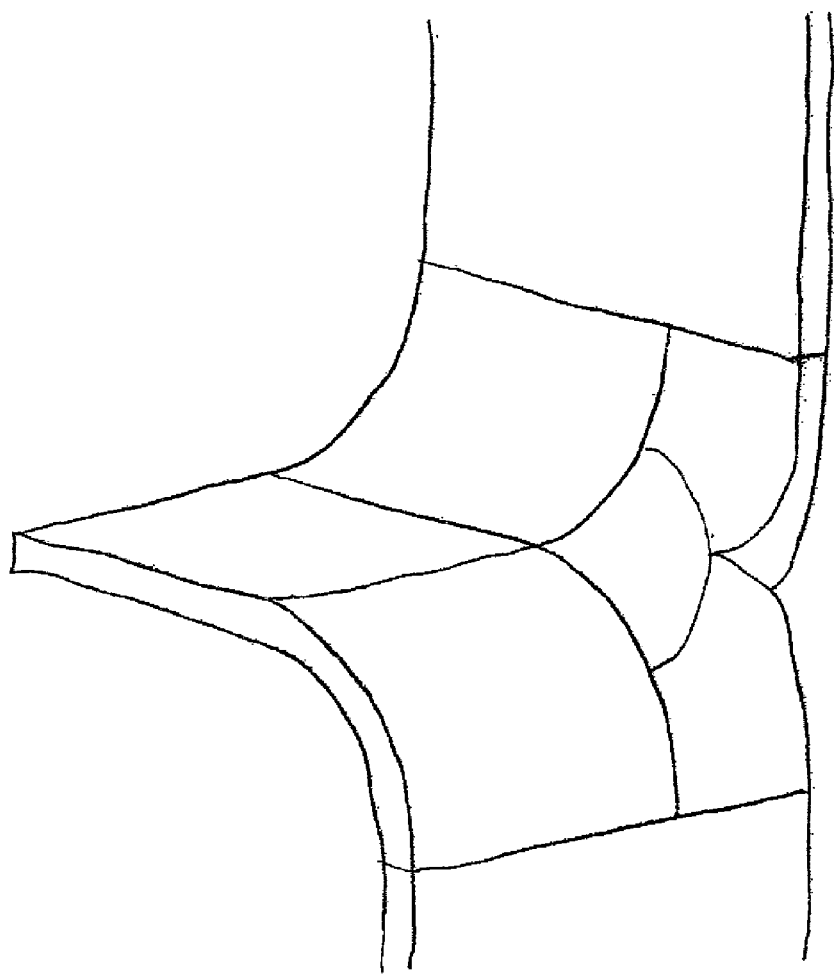
FIG. 15, illustrates a machinery corner with two sides bending in opposite directions, where one bend is positive ninety degrees, and the other bend is negative ninety degrees.
Figure 16:
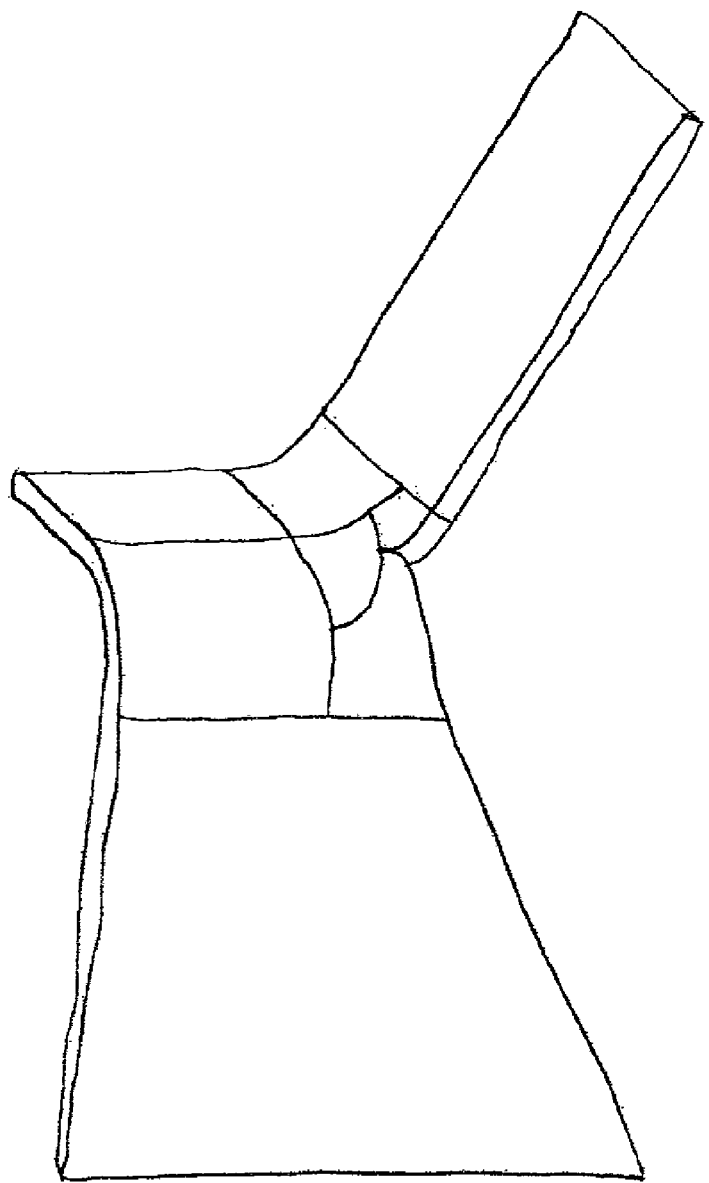
FIG. 16, illustrates a machinery corner with two sides bending in opposite directions, where one bend is greater than positive ninety degrees, and the other bend is negative degrees.

With the improved method disclosed herein, 3D CAD systems are able to create machinery corners as illustrated in FIGS. 14-16, where both corners are formed, both corners are unformed, or one corner is formed while the other is unformed. Further, the preferred embodiment can create machinery corners where one of the bend angles are more than ninety degrees, as seen in FIG. 17.

Figure 17:
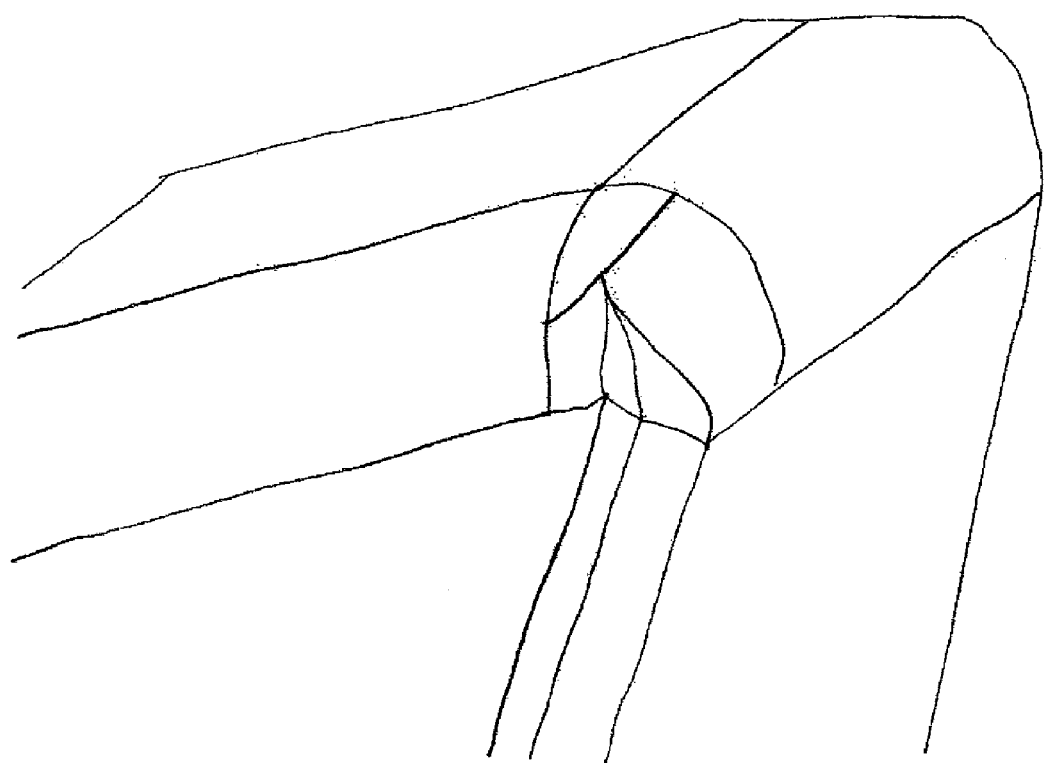
FIG. 17, illustrates a machinery corner between two formed bends, where at least one of those bends is less than ninety degrees.
Figure 18:
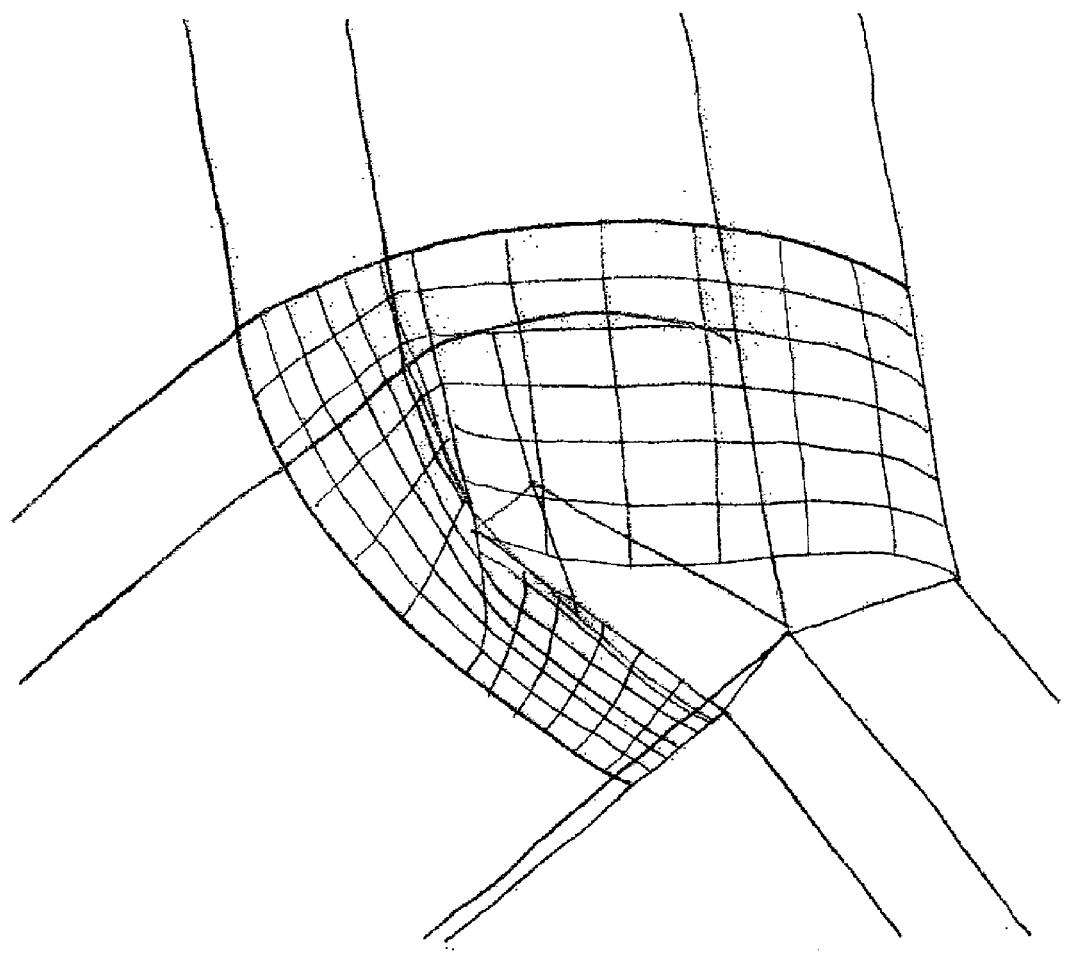
FIG. 18, illustrates an isoparametric curves on a surface view of FIG. 17.
Figure 19:
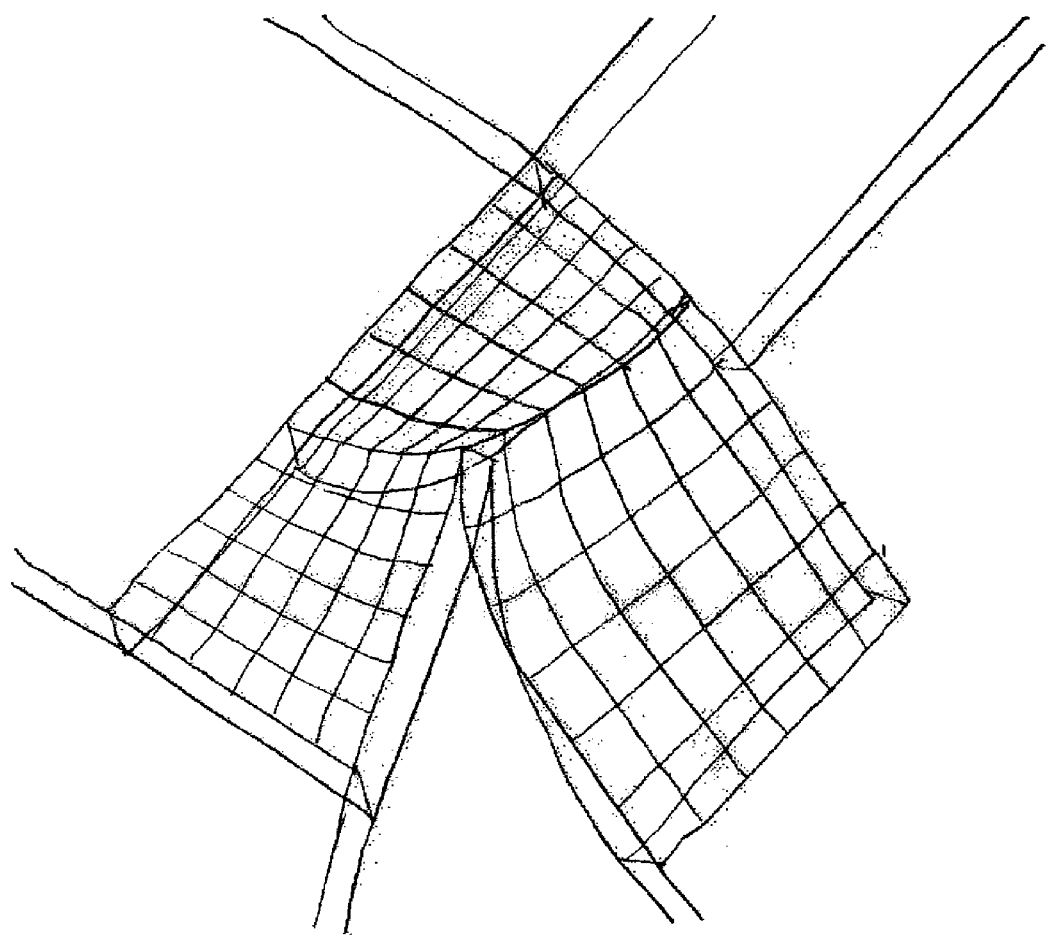
FIG. 19, illustrates an isoparametric curves on a surface view of FIG. 14'.

It is important to note that an additional benefit of the disclosed method for creating machinery corners is the consistent parameterization among all states, so there is no central rail edge to separate two bending forms, as illustrated in FIGS. 18 & 19, which are isoparametric views of FIG. 17 and FIG. 14', respectively.

III. Summary

This concludes the description of the preferred embodiment of the invention. The following describes some alternative embodiments for accomplishing the present invention. For example, the invention may be implemented in digital electronic circuitry, or in computer hardware, firmware, software, or in combinations thereof. An apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

The foregoing description of the preferred embodiment of the invention has been described for the purposes of illustration and description. It is not intended to be exhaustive or to limit the invention to the precise form disclosed. Many modifications and variations in the disclosed embodiment may occur to those skilled in the art once they learn of the basic inventive concepts. Therefore, it is intended that the scope of the invention be limited not by this detailed description, but rather by all variations and modifications as may fall within the spirit and the scope of the claims appended hereto.

What is claimed is:

1. A method for creating a parametric corner on a three-dimensional design, comprising the steps of:
    associating a plurality of adjacent geometric members on a target body,
    calculating, in a computer, a plurality of mapped bend lines relative to said geometric members, at least one of said mapped bend lines connecting a first point on a first surface of said target body and a second point on a second surface of said target body, said first point calculated from a first normal to a first line extended from a flange of said target body and said second point calculated from a second normal to a second line extended from said flange of said target body,
    connecting, by the computer, at least one parametric surface to said geometric members, and
    forming a machinery corner, by the computer, by sewing each of said parametric surfaces together,
    whereby a design feature can be successfully placed on said machinery corner.

2. The method of claim 1, wherein said associating a plurality of adjacent geometric members consists of creating a butt-joint.

3. The method of claim 1, wherein said associating a plurality of adjacent geometric members consists of creating a butt-joint between a first flange and a second flange and trimming at least one extrude.

4. The method of claim 1, wherein said calculating of said plurality of mapped bend lines is derived from a normal to a bend tangent line.

5. The method of claim 1, further comprising the step of uniting said machinery corner to said target body.

6. The method of claim 1, further connecting said at least one parametric surface to said geometric members, comprising the steps of:
    subdividing said parametric surface into a first surface portion and a second surface portion, forming a first B-surface constrained by at least one said mapped bend line and a geometric member common point on said first surface portion, and
    forming at least one B-surface on said second surface portion.

7. The method of claim 1, wherein each of said geometric members is in one of a formed state, an unformed state and a formed-unformed state.

8. The method of claim 1, wherein at least two of said geometric members contain a plurality of discrete parameters.

9. The method of claim 1, wherein at least two of said geometric members contain a plurality of discrete parameters, wherein each of said geometric members are in one of a formed state, an unformed state and a formed-unformed state.

10. The method of claim 1, wherein at least two of said geometric members contain a plurality of discrete parameters, wherein said plurality of discrete parameters contain at least one of a bend angle, a bend radii, a corner angle, and a bend direction.

11. The method of claim 1, wherein said mapped bend lines subdivide atleast one side bend face on one of said geometric members.

12. The method of claim 1, wherein said parametric corner has a top parametric surface and a bottom parametric surface.

13. The method of claim 1, wherein said second surface portion of said parametric surface has two B-surfaces.

14. A tangible, non-transitory computer-readable medium storing computer executable instructions that, when executed, cause a computer system to create a parametric corner on a three-dimensional design, the instructions comprising:
    instructions for associating a plurality of adjacent geometric members on a target body,
    instructions for calculating a plurality of mapped bend lines relative to said geometric members, at least one of said mapped bend lines connecting a first point on a first surface of said target body and a second point on a second surface of said target body, said first point calculated from a first normal to a first line extended from a flange of said target body and said second point calculated from a second normal to a second line extended from said flange of said target body,
    instructions for connecting at least one parametric surface to said geometric members, and
    instructions for forming a machinery corner by sewing each of said parametric surfaces together,
    whereby a design feature can be successfully placed on said machinery corner.

15. The computer-program product of claim 14, wherein associating said plurality of geometric members consists of trimming at least one extrude.

16. The computer-program product of claim 14, further comprising instructions for uniting said machinery corner to said target body.

17. The computer-program product of claim 14, further comprising:
    instructions for subdividing said parametric surface into a first surface portion and a second surface portion,
    instructions for forming a first B-surface constrained by at least one said mapped bend line and a geometric member common point on said first surface portion, and
    instructions for forming at least one B-surface on said second surface portion, wherein said three-dimensional design is a sheet metal design.

18. The computer-program product of claim 14, wherein each of said geometric members are in one of a formed state, an unformed state and a formed-unformed state.

19. The computer-program product of claim 14, wherein at least two of said geometric members contain a plurality of discrete parameters.

20. The computer-program product of claim 14, wherein at least two of said geometric members contain a plurality of discrete parameters, wherein each of said geometric members are in one of a formed state, an unformed state and a formed-unformed state.

21. The computer-program product of claim 14, wherein at least two of said geometric members contain a plurality of discrete parameters, wherein said plurality of discrete parameters contain at least one of a bend angle, a bend radii, a corner angle, and a bend direction.

22. The computer-program product of claim 14, wherein said mapped bend lines subdivide at least one side bend face on one of said geometric members.

23. The computer-program product of claim 14, wherein said parametric corner has a top parametric surface and a bottom parametric surface.

24. The computer-program product of claim 14, wherein said second surface portion of said parametric surface has two B-surfaces.

25. A method for creating a parametric corner having a top parametric surface and a bottom parametric surface on a sheet metal design, comprising the steps of:

associating, by a computer, a plurality of adjacent geometric members on a target body by trimming at least one extrude, wherein each of said geometric members are in one of a formed state, an unformed state and a formed-unformed state, having a plurality of discrete parameters, wherein said plurality of discrete parameters contain at least one of a bend angle, a bend radii, a corner angle, and a bend direction, calculating, by the computer, a plurality of mapped bend lines relative to said geometric members, wherein said mapped bend lines subdivide at least one side bend face on one of said geometric members, and wherein at least one of said mapped bend lines connects a first point on a first surface of said target body and a second point on a second surface of said target body, said first point calculated from a first normal to a first line extended from a flange of said target body and said second point calculated from a second normal to a second line extended from said flange of said target body, connecting, by the computer, at least one parametric surface to said geometric members, comprising the steps of:

subdividing said parametric surface into a first surface portion and a second surface portion, forming a first B-surface constrained by at least one said mapped bend line and a geometric member common point on said first surface portion, and forming at least one B-surface on said second surface portion, and forming a machinery corner, by the computer, by sewing each of said parametric surfaces together, and uniting said machinery corner to said target body by the computer, whereby a design feature can be successfully placed on said machinery corner.

\* \* \* \* \*